(12) United States Patent
Theverapperuma et al.

(10) Patent No.: US 11,494,930 B2
(45) Date of Patent: Nov. 8, 2022

(54) TECHNIQUES FOR VOLUMETRIC ESTIMATION

(71) Applicant: SafeAI, Inc., Milpitas, CA (US)

(72) Inventors: Lalin Theverapperuma, Santa Clara, CA (US); Bibhrajit Halder, Sunnyvale, CA (US); Koushik Balasubramanian, Salem (IN)

(73) Assignee: SafeAI, Inc., Milpitas, CA (US)

( * ) Notice: Subject to any disclaimer, the term of this patent is extended or adjusted under 35 U.S.C. 154(b) by 482 days.

(21) Appl. No.: 16/657,921

(22) Filed: Oct. 18, 2019

(65) Prior Publication Data

US 2020/0394813 A1 Dec. 17, 2020

Related U.S. Application Data

(60) Provisional application No. 62/863,211, filed on Jun. 18, 2019, provisional application No. 62/862,633, filed on Jun. 17, 2019.

(51) Int. Cl.
*G06T 7/00* (2017.01)
*G06T 7/62* (2017.01)
(Continued)

(52) U.S. Cl.
CPC ............... *G06T 7/62* (2017.01); *B25J 9/163* (2013.01); *E02F 9/262* (2013.01); *G05D 1/0088* (2013.01);
(Continued)

(58) Field of Classification Search
CPC ..... G06T 7/62; G06T 7/11; G06T 7/55; G06T 15/08; G06T 2207/10028;
(Continued)

(56) References Cited

U.S. PATENT DOCUMENTS 10,186,049 B1 * 1/2019 Boardman ................ G06T 7/55
10,403,037 B1 * 9/2019 Boardman ................ G06T 7/60
(Continued)

OTHER PUBLICATIONS

U.S. Appl. No. 16/938,312, Non-Provisional Application filed Jul. 24, 2020, 78 pages.
(Continued)

*Primary Examiner* — Van D Huynh
(74) *Attorney, Agent, or Firm* — Kilpatrick Townsend & Stockton LLP

(57) ABSTRACT

The present disclosure relates generally to the operation of autonomous machinery for performing various tasks at various industrial work sites, and more particularly to the volumetric estimation and dimensional estimation of a pile of material or other object, and the use of multiple sensors for the volumetric estimation and dimensional estimation of a pile of material or other object at such work sites. An application and a framework is disclosed for volumetric estimation and dimensional estimation of a pile of material or other object using at least one sensor, preferably a plurality of sensors, on an autonomous machine (e.g., robotic machines or autonomous vehicles) in various worksite environments applicable to various industries such as, construction, mining, manufacturing, warehousing, logistics, sorting, packaging, agriculture, etc.

20 Claims, 15 Drawing Sheets

(51) Int. Cl.
*G06K 9/62* (2022.01)
*G06T 15/08* (2011.01)
*G06T 7/55* (2017.01)
*G05D 1/00* (2006.01)
*G05D 1/02* (2020.01)
*E02F 9/26* (2006.01)
*B25J 9/16* (2006.01)
*G06N 20/00* (2019.01)
*G06T 7/11* (2017.01)

(52) U.S. Cl.
CPC ......... *G05D 1/0248* (2013.01); *G05D 1/0257* (2013.01); *G06K 9/628* (2013.01); *G06K 9/6257* (2013.01); *G06N 20/00* (2019.01); *G06T 7/11* (2017.01); *G06T 7/55* (2017.01); *G06T 15/08* (2013.01); *G06T 2207/10028* (2013.01); *G06T 2207/10044* (2013.01); *G06T 2207/20081* (2013.01)

(58) Field of Classification Search
CPC .. G06T 2207/10044; G06T 2207/20081; B25J 9/163; E02F 9/262; E02F 3/434; E02F 3/437; E02F 9/205; G05D 1/0088; G05D 1/0248; G05D 1/0257; G06K 9/6257; G06K 9/628; G06K 9/627; G06N 20/00; G06N 3/0445; G06N 3/0454; G06N 3/084; G06N 7/005; G06V 20/56; G05B 2219/39271

USPC .......................................................... 701/27
See application file for complete search history.

(56) References Cited

U.S. PATENT DOCUMENTS

| | | | |
|---|---|---|---|
| 2012/0191431 A1* | 7/2012 | Dunbabin | E02F 9/2029 703/6 |
| 2016/0227193 A1* | 8/2016 | Osterwood | B25J 9/1697 |
| 2016/0349733 A1* | 12/2016 | Talmaki | E02F 9/205 |
| 2018/0190014 A1* | 7/2018 | Yarborough | G01S 7/4808 |
| 2019/0033877 A1* | 1/2019 | Wei | E02F 9/205 |
| 2019/0079526 A1* | 3/2019 | Vallespi-Gonzalez | G05D 1/0221 |
| 2019/0176321 A1* | 6/2019 | Afrouzi | A47L 9/00 |
| 2019/0266418 A1* | 8/2019 | Xu | G06V 10/457 |
| 2020/0409377 A1* | 12/2020 | Ready-Campbell | G05D 1/0246 |

OTHER PUBLICATIONS

International Patent Application No. PCT/US2019/064776, International Search Report and Written Opinion dated Feb. 25, 2020, 9 pages.

* cited by examiner

TECHNIQUES FOR VOLUMETRIC ESTIMATION

CROSS-REFERENCES TO RELATED APPLICATIONS

This application claims the benefit of and priority to U.S. Provisional Application No. 62/862,633 filed Jun. 17, 2019, entitled "TECHNIQUES FOR VOLUMETRIC ESTIMATION." This application also claims the benefit of and priority to U.S. Provisional Application No. 62/863,211 filed Jun. 18, 2019, entitled "TECHNIQUES FOR VOLUMETRIC ESTIMATION." The contents of U.S. Provisional Application Nos. 62/862,633 and 62/863,211 are incorporated herein in their entirety for all purposes.

TECHNICAL FIELD

The present disclosure relates generally to the operation of autonomous machinery to perform various tasks at various industrial work sites and more particularly to techniques for the volumetric estimation and dimensional estimation of a pile of material or other object, and the use of sensors for the volumetric estimation and dimensional estimation of a pile of material or other object at such work sites.

BACKGROUND

Currently, tasks involving the moving of piles or heaps of material from point to point at construction or industrial work sites are handled by time-consuming methods such as, human labor and/or complex processes involving expensive equipment. The use of robotic equipment such as, robotic arms for picking and sorting material at some sites, cannot solve complex problems related to autonomously picking material at a point and autonomously navigating to another point to drop such material. Such equipment are also limited by the field of view. Furthermore, current robotic equipment cannot accurately sense or estimate material in a timely manner in order to accurately perform and complete a task at an industrial site.

BRIEF SUMMARY

The present disclosure relates generally to the operation of autonomous machinery for performing various tasks at various industrial work sites and more particularly to techniques for the volumetric estimation and dimensional estimation of a pile of material or other object, and the use of sensors for the volumetric estimation and dimensional estimation of a pile of material or other object at such work sites. A framework for the volumetric estimation and dimensional estimation of a pile of material or other object is provided for an autonomous machine to facilitate it to autonomously perform various tasks in various industrial work-site environments, applicable to various industries such as, construction, mining, manufacturing, warehousing, logistics, sorting, packaging, agriculture, etc.

Various embodiments are described herein, including methods, systems, non-transitory computer-readable storage media storing programs, code, or instructions executable by one or more processors, and the like.

In certain embodiments, techniques are described for performing volumetric estimation of a pile of material using one or more sensors mounted on an autonomous machine. The autonomous machine may be configured to perform an operation autonomously. The autonomous machine may perform the operation using an output from performing the volumetric estimation. The autonomous machine may also be configured to communicate an output of a volumetric estimation to another machine to enable the other autonomous machine to perform an operation autonomously. For instance, in some embodiments, the autonomous machine which performs the volumetric estimation may be part of a fleet of autonomous machines deployed at a work-site for handling different types of tasks or for expediting the performance of the same task, where the task(s) involve interactions between the fleet of autonomous machines and the same pile of material.

In certain embodiments, a system includes a plurality of sensors and a controller system coupled to the plurality of sensors. The controller system is configured to receive sensor data from the plurality of sensors. The sensor data comprises a first representation of a physical environment and a second representation of the physical environment. Each of the first representation and the second representation is a two-dimensional (2D) or three-dimensional (3D) representation containing data associated with a pile of material in the physical environment. The controller system is further configured to generate a 3D representation of the pile of material. Generating the 3D representation of the pile of material involves identifying a region in the first representation as corresponding to the pile of material; identifying a region in the second representation as corresponding to the pile of material; and determining, based on the identified regions in the first representation and the second representation, a boundary of the pile of material. The controller system is further configured to estimate a volume of the pile of material based upon the 3D representation of the pile of material, and communicate information about the pile of material to a planning subsystem of an autonomous machine. The information about the pile of material includes the estimated volume. The communicating of the information about the pile of material causes an operation to be performed autonomously, by the autonomous machine, and with respect to the pile of material. The operation can be performed based on the estimated volume.

In certain embodiments, the first representation in the processing performed by the controller system described above is an image generated using at least one camera; and identifying the portion of the first representation as corresponding to the pile of material involves: inputting the first representation to a machine learning model of the controller system, the machine learning model having been trained to detect multiple classes of objects, the multiple classes of objects including a pile class; and receiving, as an output of the machine learning model, a segmented representation of the physical environment, the segmented representation including a segment corresponding to the pile class.

In certain embodiments, a machine learning model is trained prior to the receiving of sensor data by a controller system. Training of the machine learning model involves: obtaining a set of training data, the set of training data comprising at least one of 2D representations or 3D representations of real-world environments and being labeled with information indicating classes of objects represented in the training data; augmenting the set of training data, the augmenting comprising generating additional training data through image processing performed on the set of training data; inputting the augmented set of training data to the machine learning model; and adjusting the machine learning model based on comparing inferences generated by the machine learning model using the augmented set of training data to ground truth information corresponding to correct inferences for the augmented set of training data.

In certain embodiments, augmenting of a set of training data comprises at least one of the following types of image processing: scaling, blurring, rotation, color adjustment, resizing, changing image resolution, adding noise artifacts, or adding visual effects that simulate occlusions or weather conditions.

In certain embodiments, an order in which training data from the augmented set of training data is input to the machine learning model is determined such that the order maintains a ratio between a number of instances of a first class of object and a number of instances of a second class of object.

In certain embodiments, the first representation in the processing performed by the controller system described above is an image generated using one or more cameras, and the second representation is a point cloud generated using a LIDAR or radar sensor. In such embodiments, identifying the region in the second representation as corresponding to the pile of material may involve inputting the point cloud to a machine learning model that has been trained to detect pile shapes from point clouds; and receiving, as an output of the machine learning model, a voxel representation of a detected pile shape. Further, generating the 3D representation of the pile of material may involve: generating an additional voxel representation by combining the voxel representation of the detected pile shape with a segmented image generated from the first representation; and smoothing the additional voxel representation by fitting a geometric mesh over the voxel representation.

In certain embodiments, identifying the region in the second representation as corresponding to the pile of material involves inputting the second representation to a voxel estimation model configured to generate a voxel representation of the physical environment by estimating, based on a geometry of points in the point cloud, voxel heights in the voxel representation. Further, generating the 3D representation of the pile of material may involve: inputting the voxel representation to a Bayesian filter configured to determine, for each estimated voxel height, a probability that the estimated voxel height is correct based on data from the first representation, wherein the first representation is a depth image; and selecting, by the Bayesian filter and based on the determined probabilities, between information from the depth image and information from the voxel representation for generating the 3D representation of the pile of material.

In certain embodiments, a Bayesian filter receiving a voxel representation that was generated by estimating voxel heights, is configured to determine, for each estimated voxel height, a probability that the estimated voxel height is correct based on data from the first representation, wherein the first representation is a depth image. The Bayesian filter is further configured to select, based on the determined probabilities, between information from a depth image and information from the voxel representation for generating a 3D representation of a pile of material.

In certain embodiments, a Bayesian filter communicates feedback to a voxel estimation model, the feedback causing the voxel estimation model to revise estimated voxel heights to be closer to voxel heights indicated by a depth image. The depth image can be generated based on a disparity between an image from a first camera with an image from a second camera. Further, the depth image may be segmented, by a machine learning model of a controller system, for input to the Bayesian filter.

In certain embodiments, estimating the volume of the pile of material involves: determining a 3D shape corresponding to approximately half the pile of material, wherein the 3D shape is bounded by a ground plane, a back plane, and the boundary of the pile of material; calculating a volume of the 3D shape; and estimating the volume of the pile of material to be twice that of the volume of the 3D shape.

In certain embodiments, a controller system receives sensor data representing a pile of material from different sides of the pile and uses the sensor data to generate a 3D of the pile of material.

In certain embodiments, a method involves receiving, by a controller system of an autonomous machine, sensor data from a plurality of sensors, the sensor data comprising a first representation of a physical environment and a second representation of the physical environment. The first representation and the second representation are generated using different types of sensors, and each of the first representation and the second representation is a two-dimensional (2D) or three-dimensional (3D) representation containing data associated with a pile of material in the physical environment. The method further involves estimating, by the controller system, a volume of the pile of material. Estimating the volume of the pile of material involves: inputting the first representation and the second representation to a machine learning model trained to detect piles of materials and infer their volume, and receiving, as an output of the machine learning model, a value for the volume of the pile of material, the value for the volume of the pile of material being inferred from the first representation and the second representation. The method further involves communicating, by the controller system, information about the pile of material to a planning subsystem of the autonomous machine or a planning subsystem of a second autonomous machine. The information about the pile of material includes the value for the volume of the pile of material. The communicating of the information about the pile of material causes an operation to be performed autonomously, by the autonomous machine or the second autonomous machine, and with respect to the pile of material.

In certain embodiments, training of a machine learning model that subsequently receives a first representation and a second representation as input involves: inputting a set of training representations to the machine learning model; receiving a volume value inferred based on the set of training representations; comparing the inferred volume value to a ground truth volume value for the set of training representations; and adjusting the machine learning model based on a difference between the ground truth volume value and the volume value inferred based on the set of training representations. The machine learning model can comprise a plurality of subsystems, each subsystem of the plurality of subsystems configured to perform a different one of the following: combining representations from different sensor types into a single representation, detecting a pile of material in the single representation, and estimating a volume of the detected pile of material. When the machine learning model includes such a plurality of subsystems, training of the machine learning model can involve training each subsystem separately prior to performing end-to-end training of the machine learning model as a whole.

The foregoing, together with other features and embodiments will become more apparent upon referring to the following specification, claims, and accompanying drawings.

BRIEF DESCRIPTION OF THE DRAWINGS

The present disclosure can be best understood by reference to the following description taken in conjunction with the accompanying figures, in which like parts may be referred to by like numerals.

DETAILED DESCRIPTION

Figure 1A:
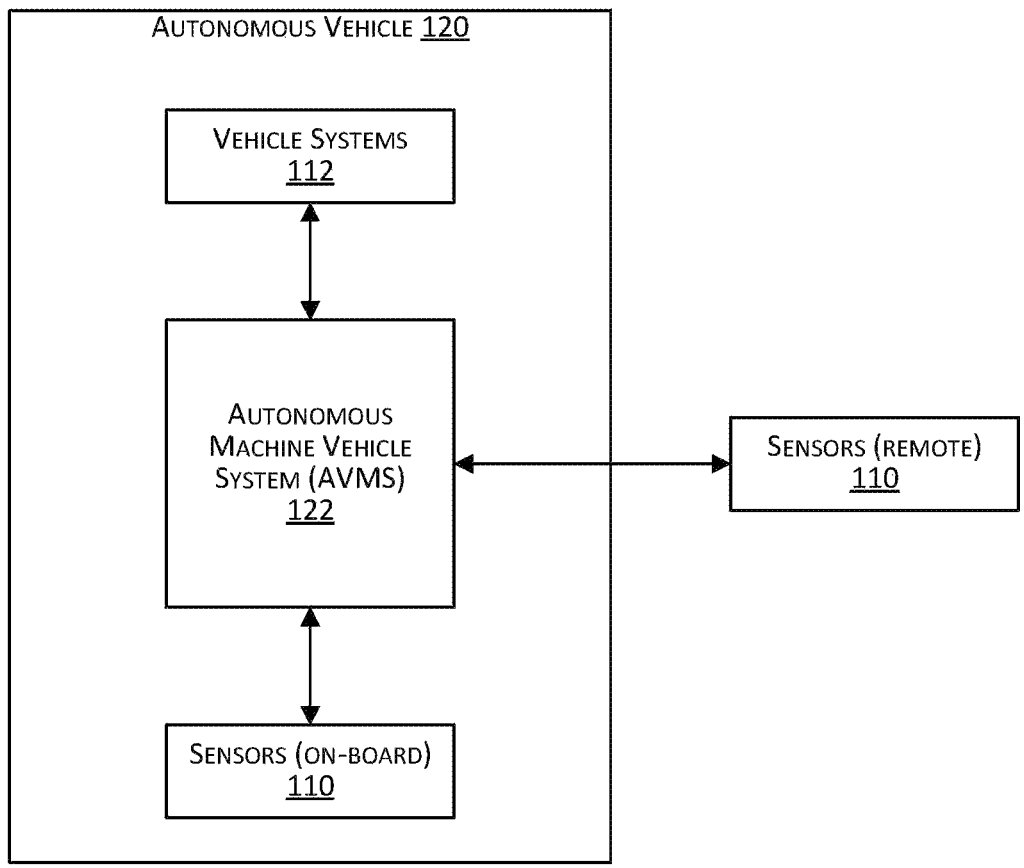
FIG. 1A is a high level simplified block diagram of an autonomous vehicle incorporating a controller system (referred to herein as an autonomous vehicle management system (AVMS)) according to certain embodiments.

Exemplary examples and embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchanges of or combinations of some or all of the described or illustrated elements. Wherever convenient, the same reference numbers will be used throughout the drawings to refer to the same or similar parts.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

The present disclosure relates generally to the operation of autonomous machinery for performing various tasks at various industrial work sites, and more particularly to the volumetric estimation and dimensional estimation of a pile of material or other object, and the use of sensors for the volumetric estimation and dimensional estimation of a pile of material or other object at such work sites. An application and a framework is disclosed for volumetric estimation and dimensional estimation of a pile of material or other object using at least one sensor, preferably a plurality of sensors, on an autonomous machine (e.g., a robotic machine or an autonomous vehicle) in various work-site environments applicable to various industries such as, construction, mining, manufacturing, warehousing, logistics, sorting, packaging, agriculture, etc.

As used herein a "pile of material" refers to one or more types of materials or objects that are stacked, laid on top of each other, or otherwise grouped together to form a mass, for example, a mound of material. Materials that make up a pile can be of various shapes and sizes, for example, dirt, rocks, construction debris, and the like. Piles also vary in shape, size, density, etc. For example, a berm is a type of pile commonly found in mining sites. Berms often function as a guard rail to prevent vehicles from moving beyond certain areas, and typically have a trapezoidal or triangular cross-section.

The present disclosure describes several embodiments in the context of an autonomous vehicle. The use of the term "vehicle" and description with respect to a vehicle is not intended to be limiting or restrictive. The teachings described herein can be use with and applied to any autonomous equipment, including autonomous vehicles and other types of autonomous machines that are configured to perform one or more tasks or operations in an automated manner, and substantially free of any human intervention.

FIG. 1A is a high level simplified block diagram of an autonomous vehicle 120 incorporating a controller system (referred to herein as autonomous vehicle management system (AVMS) 122) according to certain embodiments. For purposes of this disclosure, an autonomous vehicle, such as autonomous vehicle 120, is a vehicle that is capable of performing one or more operations autonomously and substantially free of any human user or manual input. For example, in certain embodiments, the autonomous operation may be the ability of the vehicle 120 to autonomously sense its environment and navigate or drive along a path autonomously and substantially free of any human user or manual input. Examples of other autonomous operations include, without limitation, scooping and dumping operations, moving materials or objects (e.g., moving dirt or sand from one area to another), lifting materials, driving, rolling, spreading dirt, excavating, transporting materials or objects from one point to another point, and the like.

Autonomous vehicle 120 can be of various different types. For example, autonomous vehicle 120 can be a car or mobile machine that can be used to transport people and/or cargo. Autonomous vehicle 120 can be a specialized vehicle for performing specialized operations such as road or path compacting, rolling, digging, lifting, etc. Examples of autonomous vehicle 120 include without restriction wagons, bicycles, motor vehicles (e.g., motorcycles, cars, trucks, buses), railed vehicles (e.g., trains, trams), watercrafts (e.g., ships, boats), aircrafts, spacecraft, and/or heavy equipment vehicles (e.g. dump trucks, tractors, bull dozers, excavators, forklifts, etc.). Since the environment of autonomous vehicle 120 can include other vehicles, including other autonomous vehicles, for purposes of clarity, in order to differentiate autonomous vehicle 120 from other vehicles in its environment, autonomous vehicle 120 is also sometimes referred to as the ego vehicle.

Various features have been described below using an autonomous vehicle as an example. However, this is not intended to be limiting. The teachings described herein can be applied to any machine that is capable of performing one or more autonomous operations. For example, the teachings can be used by a loader, a compactor, and the like. The machines may be used in various industries such manufacturing, mining, construction, medical applications, packaging, assembly, surveying, mapping technologies logistics, etc.

As depicted in FIG. 1A, in addition to autonomous vehicle management system 122, autonomous vehicle 120 may include or be coupled to sensors 110, and vehicle systems 112. Autonomous vehicle management system 122 may be communicatively coupled with sensors 110 and vehicle systems 112 via wired or wireless links. One or more different communication protocols may be used for facilitating communications between autonomous vehicle management system 122 and sensors 110 and between autonomous vehicle management system 122 and vehicle systems 112.

Vehicle systems 112 can include various electro-mechanical systems, components, linkages, etc. that enable autonomous vehicle 120 to perform its intended functions such as traveling or navigating along a particular path or course. Vehicle systems 112 may include for example, a steering system, a throttle system, a braking system, a propulsion system, etc. for driving the autonomous vehicle, electrical systems, auxiliary systems (e.g., systems for outputting information to a driver or passenger of autonomous vehicle 120), and the like. Vehicle systems 112 can be used to set the path and speed of autonomous vehicle 120. In an autonomous vehicle that is configured to perform a specialized operation (e.g., a dump truck that is specialized to perform lift and dump operations, a tractor, etc.), the vehicle systems 112 may also include systems that are configured to perform such specialized operations.

Figure 3:
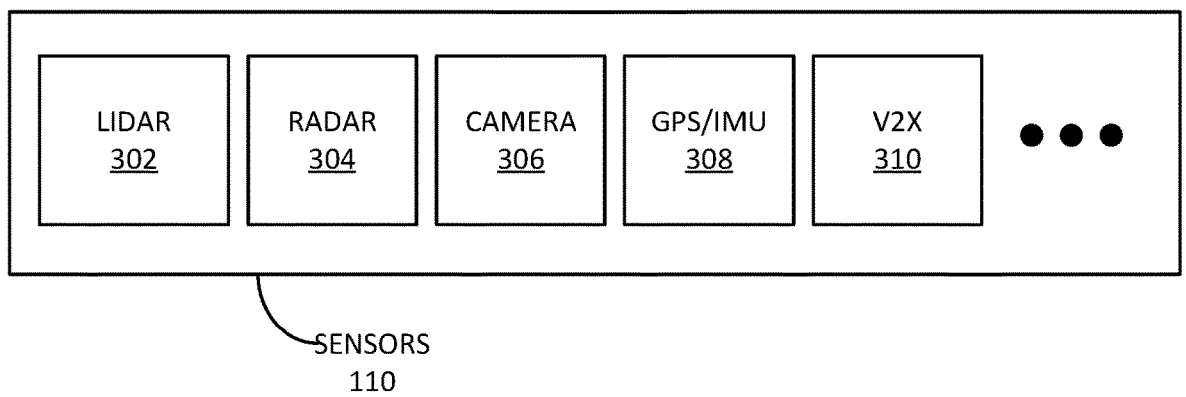
FIG. 3 illustrates an example set of sensors of an autonomous machine according to certain embodiments.

Sensors 110 may be located on or in autonomous vehicle 120 ("onboard sensors") or may even be located remotely ("remote sensors") from autonomous vehicle 120. Autonomous vehicle management system 122 may be communicatively coupled with remote sensors via wireless links using a wireless communication protocol. Sensors 110 can obtain environmental information for autonomous vehicle 120. This sensor data can then be fed to autonomous vehicle management system 122. FIG. 3 illustrates an example set of sensors 110 of an autonomous vehicle, including, without limitation, LIDAR (Light Detection and Ranging) sensors 302, radar 304, cameras 306 (different kinds of cameras with different sensing capabilities may be used), Global Positioning System (GPS) and Inertial Measurement Unit (IMU) sensors 308, Vehicle-to-everything (V2X) sensors 310, audio sensors, and the like. Sensors 110 can obtain (e.g., sense, capture) environmental information for autonomous vehicle 120 and communicate the sensed or captured sensor data to autonomous vehicle management system 122 for processing. Other sensors may include proximity sensors, SONAR sensors, and other sensors.

Examples of radar sensors 304 (e.g., long range radar, short range radar, imaging radar etc.) may include sensors that are used to detect objects in the environment of autonomous vehicle 120 and to determine the velocities of the detected objects. Examples of LIDAR sensors 302 include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, autonomous vehicle 120 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

As will be described below, in certain embodiments, data obtained from different types of sensors or multiple instances of the same type of sensor may be combined or fused to form a three-dimensional (3D) representation of a pile of material or other object of interest, from which representation one or more properties of the pile of material/object (e.g., the volume of the pile) can be estimated. Various types of sensor combinations may be employed for the purpose of obtaining data for generating the 3D representation. Combining different sensor types has certain advantages. For example, cameras are capable of generating highly detailed images of the environment the objects within it, whereas LIDAR and radar provide better depth perception. LIDAR is generally more accurate than radar when detecting stationary objects, whereas radar is more accurate at detecting moving objects.

Autonomous vehicle management system 122 (also referred to as a controller system) is configured to process data describing the state of autonomous vehicle 120 and the state of the autonomous vehicle's environment, and based upon the processing, control one or more autonomous functions or operations of autonomous vehicle 120. For example, autonomous vehicle management system 122 may issue instructions/commands to vehicle systems 112 to programmatically and autonomously control various aspects of the autonomous vehicle's motion such as the propulsion, braking, steering or navigation, and auxiliary behavior (e.g., turning lights on) functionality of autonomous vehicle 120. Autonomous vehicle management system 122 implements the control and planning algorithms that enable autonomous vehicle 120 to perform one or more operations autonomously.

Autonomous vehicle management system 122 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 1A, autonomous vehicle management system 122 is shown as being in or on autonomous vehicle 120. This is however not intended to be limiting. In alternative embodiments, autonomous vehicle management system 122 can also be remote from autonomous vehicle 120.

Autonomous vehicle management system 122 receives sensor data from sensors 110 on a periodic or on-demand basis. Autonomous vehicle management system 122 uses the sensor data received from sensors 110 to perceive the autonomous vehicle's surroundings and environment. Autonomous vehicle management system 122 uses the sensor data received from sensors 110 to generate and keep updated a digital model that encapsulates information about the state of autonomous vehicle and of the space and environment surrounding autonomous vehicle 120. This digital model may be referred to as an internal map, which encapsulates the current state of autonomous vehicle 120 and its environment. The internal map along with other information is then used by autonomous vehicle management system 122 to make decisions regarding actions (e.g., navigation, braking, acceleration, scooping, dumping, etc.) to be performed by autonomous vehicle 120. Autonomous vehicle management system 122 may send instructions or commands to vehicle systems 112 to cause the actions be performed by the systems of vehicles systems 112.

Figure 1B:
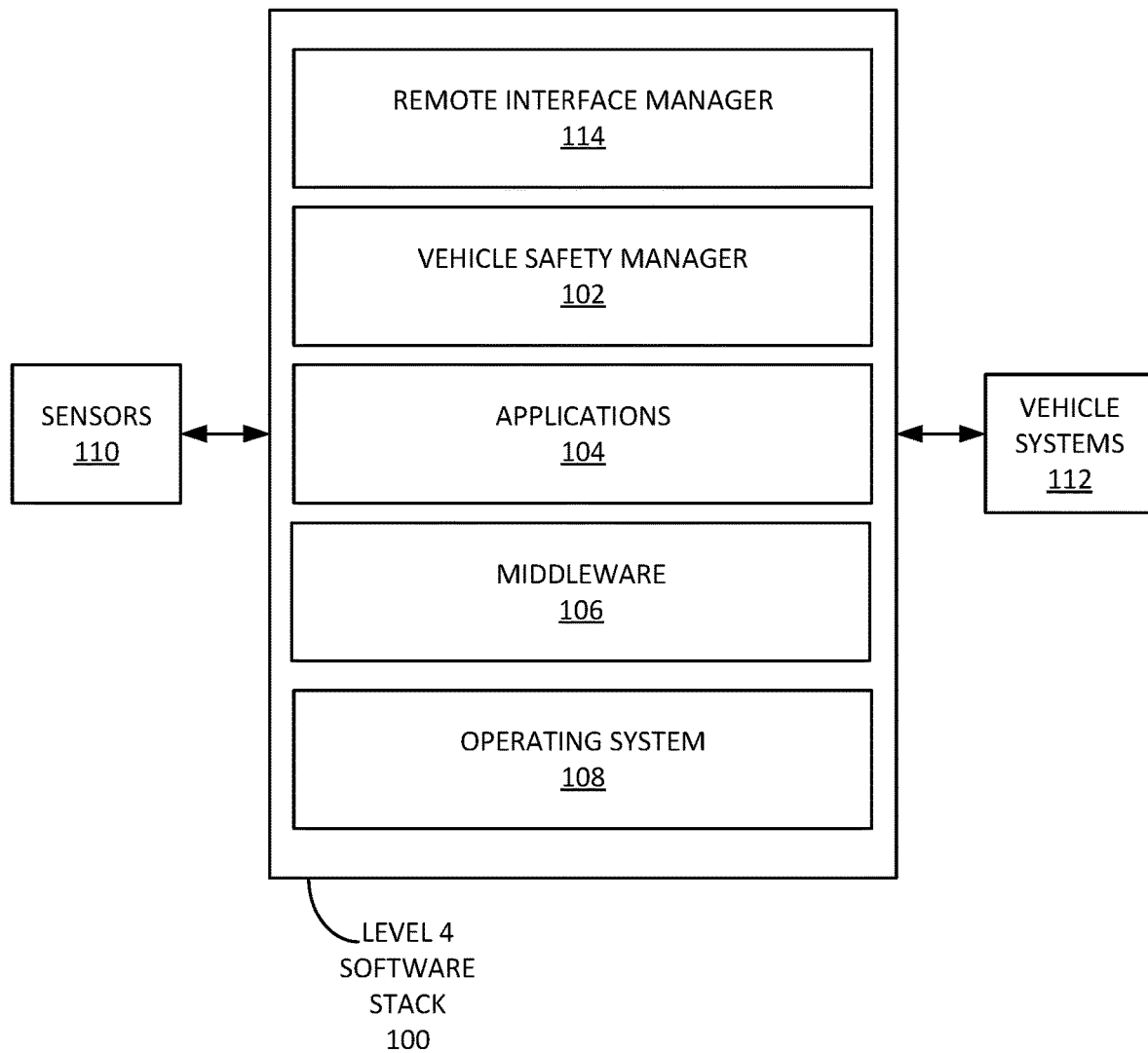
FIG. 1B depicts an example autonomous vehicle management system implemented primarily in software, according to some embodiments.

As indicated above, autonomous vehicle management system 122 may be implemented using software only, hardware only, or combinations thereof. FIG. 1B depicts an example autonomous vehicle management system wherein autonomous vehicle management system 122 is implemented primarily in software, according to some embodiments. Autonomous vehicle management system 122 may be implemented as a fully autonomous vehicle software stack 100. Fully autonomous vehicle software stack 100 can include a vehicle safety manager 102, a remote interface manager 114, applications 104, middleware 106, and operating system 108. Fully autonomous vehicle software stack 100 may be used to implement the functionalities of the various systems and subsystems described above.

Figure 2A:
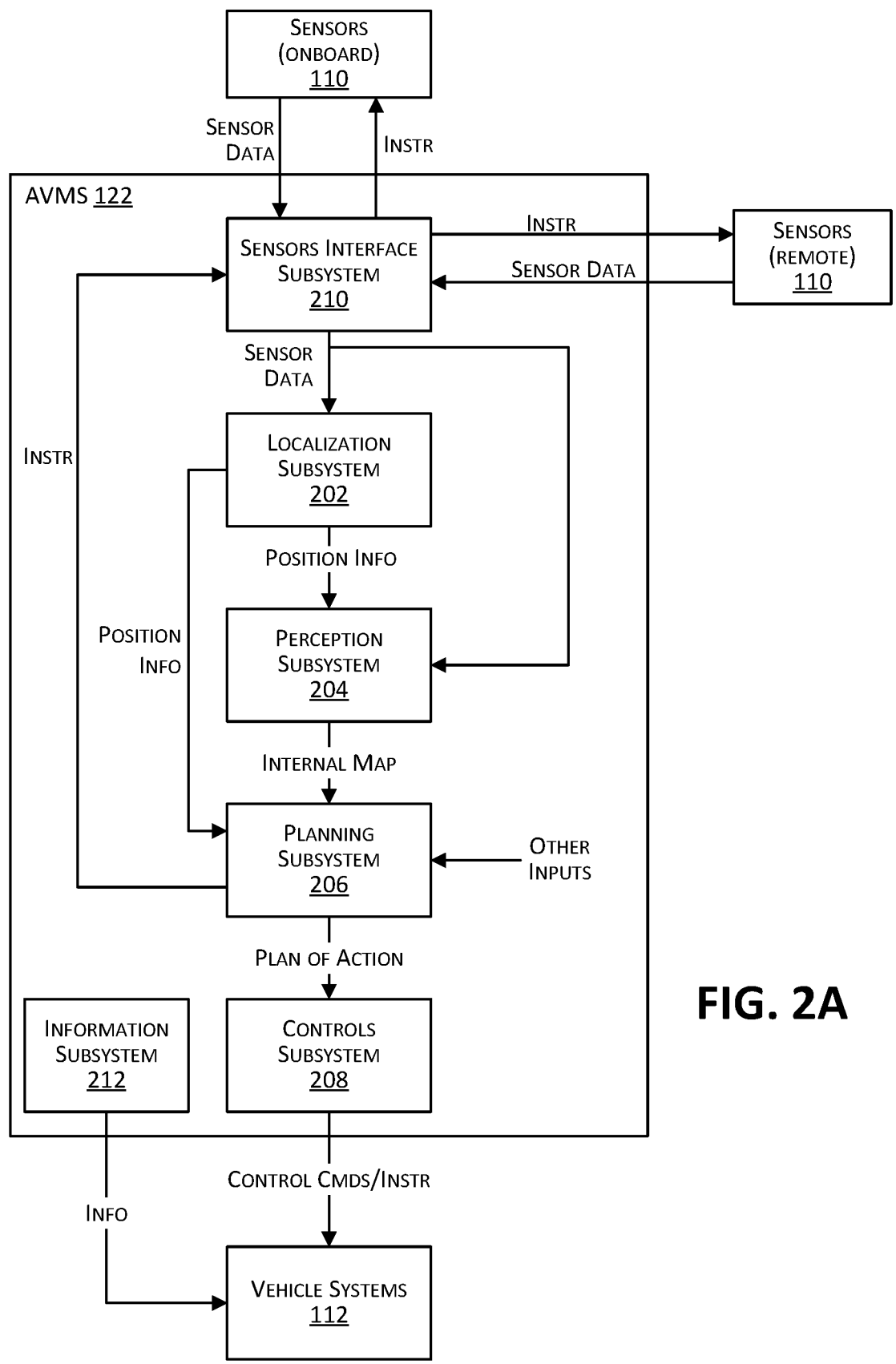
FIG. 2A is a simplified block diagram depicting subsystems of an autonomous vehicle management system according to certain embodiments.

FIG. 2A is a simplified block diagram depicting subsystems of autonomous vehicle management system 122 according to certain embodiments. Autonomous vehicle management system 122 may comprise multiple systems or subsystems communicatively coupled to each other via one or more communication channels. In the embodiment depicted in FIG. 2A, the subsystems include a sensors interface subsystem 210, a localization subsystem 202, a perception subsystem 204, a planning subsystem 206, a controls subsystem 208, and an information subsystem 212.

Autonomous vehicle management system 122 embodiment depicted in FIG. 2A is merely an example and is not intended to unduly limit the scope of claimed embodiments. One of ordinary skill in the art would recognize many possible variations, alternatives, and modifications. For example, in some implementations, autonomous vehicle management system 122 may have more or fewer subsystems or components than those shown in FIG. 2A, may combine two or more subsystems, or may have a different configuration or arrangement of subsystems. The subsystems may be implemented using software only, hardware only, or combinations thereof. In the embodiment depicted in FIG. 2A, autonomous vehicle management system 122 and all its subsystems are shown as being in or on autonomous vehicle 120. This is however not intended to be limiting. In alternative embodiments, all the subsystems of autonomous vehicle management system 122 or certain subsystems of autonomous vehicle management system 122 can also be remote from autonomous vehicle 120.

Sensors interface subsystem 210 provides an interface that enables communications between sensors 110 (including on-board sensors and remote sensors) and autonomous vehicle management system 122. Sensors interface subsystem 210 may receive sensor data from sensors 110 and provide the data to one or more other subsystems of autonomous vehicle management system 122. For example, as depicted in FIG. 2A, sensor data may be provided to localization subsystem 202 and perception subsystem 204 for further processing. The sensor data collected by the various sensors 110 enables autonomous vehicle management system 122 to construct a view or picture of autonomous vehicle 120 and its surrounding environment.

In certain embodiments, autonomous vehicle management system 122 enables one or more subsystems of autonomous vehicle management system 122 to send instructions or commands to one or more sensors 110 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 122. Using these instructions, autonomous vehicle management system 122 can dynamically control the sensor data that is communicated from sensors 110 to autonomous vehicle management system 122. Further details on this are provided below in the context of functions performed by planning subsystem 206.

Localization subsystem 202 is configured to receive sensor data from sensors 110, and based upon the sensor data, identify the location of autonomous vehicle 120 in its surrounding environment (vehicle localization). Localization subsystem 202 provides current, local position information of the ego vehicle with respect to its environment (example: mine). The position of the ego vehicle 120 may be determined with respect to a pre-defined map that is generated by perception subsystem 204. In certain embodiments, localization subsystem 202 is configured to broadcast the ego vehicle's position information to other systems or subsystems of autonomous vehicle 120. The other systems or subsystems may then use the position information as needed for their own processing.

Localization subsystem 202 may implement various functions such as internal map management, map matching, visual odometry, dead reckoning, location history management, and the like. For example, assume that autonomous vehicle 120 is driving in a mine. Localization subsystem 202 may receive as input a map of the mine. A mine usually has a set path comprising drivable and non-drivable areas and a set road for mining vehicles to follow around a mine. Localization subsystem 202 may determine the position of the ego vehicle along the path. Localization subsystem 202 may do so by utilizing multiple inputs it receives from sensors and maps of the environment. Localization subsystem 202 may use GPS sensor data to determine the global positioning of the ego vehicle. Localization subsystem 202 may receive the GPS sensor data and translate it to a more useful form that is usable by one or more other subsystems of autonomous vehicle management system 122. For example, information, localization subsystem 202 may identify where the ego vehicle is positioned with respect to a map of the environment, such as a mine map (also referred to as map management).

Localization subsystem 202 may also be configured to perform map matching, where what localization subsystem 202 perceives is matched with the information that it has. Map matching can match recorded geographic coordinates to a logical model of the real world, (e.g., using a Geographic Information System (GPS), etc.). In one example, a map matching algorithm can obtain a recorded, serial location points (e.g. from GPS) and relate them to edges in an existing street graph (e.g., as a network). This can be in a sorted list representing the travel of an autonomous vehicle. As part of map matching, localization subsystem 202 is tracking the ego vehicle in its environment and deducing its position based on what localization subsystem 202 sees relative to a map, such as a real world map.

Localization subsystem 202 is also configured to perform visual odometry, which involves determining the orientation and position of the ego vehicle based upon sensor data, such as by analyzing images captured by one or more cameras.

Localization subsystem 202 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 122 receives and knows certain information about autonomous vehicle 120 such as it wheel speed, steering angle, where autonomous vehicle 120 was a second ago, and the like. Based on the past position information and in combination with speed/steering angle etc., localization subsystem 202 can determine the vehicle's next location or current location. This provides local understanding of the ego vehicle's position as it moves on its path. A path can be a road, highway, rail system, runway, boat route, bike path, etc., according to various embodiments.

Localization subsystem 202 may also perform local history management tracking, where historical information about the ego vehicle's path is analyzed and compared to the current path. For example, if autonomous vehicle 120 drives around a certain path in a mine many number of times, this information can be compared and analyzed by localization subsystem 202.

Localization subsystem 202 may also implement a consistency module that is configured to perform rationality checks, deficiency checks, normalize sensor data, etc. For example, localization subsystem 202 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true. The sensor data received from sensors 110 can also be normalized and the normalized sensor data then provided to localization subsystem 202. Localization subsystem 202 can then utilize the normalized sensor data to generate and/or update the consistent internal map of the real-time (e.g., assuming networking and processing latencies, etc.) environment of the autonomous vehicle.

Perception subsystem 204, periodically or on-demand, receives sensor data from sensors 110 and builds and maintains a consistent internal map based upon the received information. Perception subsystem 204 may also receive inputs from other sources, such as from localization subsystem 202, and use the received inputs to build and maintain the internal map. The internal map generated by perception subsystem 204 contains all the information including the ego vehicle's information, state of the ego vehicle and its environment, information about objects in the ego vehicle's environment (e.g., information regarding dynamic and static objects around ego vehicle). Consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 204 receives position information from localization subsystem 202 and incorporates the position information in the internal map. The internal map can be maintained even in the event that a sensor falls offline.

Rationality checks and normalization may be performed on the sensor data received by perception subsystem 204. These checks can include tests to evaluate whether a sensor data value and/or the result of a calculation can possibly be true. The sensor data received from sensors 110 can also be normalized and the normalized sensor data then provided to perception subsystem 204. Perception subsystem 204 can then utilize the normalized sensor data to generate and/or update the consistent internal map of the real-time environment of the autonomous vehicle.

Perception subsystem 204 may use various different algorithms and techniques to perform its functions, including artificial intelligence (AI) and machine learning based techniques. For example, perception subsystem 204 may use a convolutional neural network (CNN) to perform object detection and object classification based upon the sensor data. During a training phase, the CNN may be trained using labeled training data comprising sample images of a vehicle's environment and corresponding ground truth classifications. Labeled data generally includes a group of samples that have been tagged with one or more labels, where the labels represent known results (e.g., ground truth classification, etc.) for the training input samples. Labeling can also be used to take a set of unlabeled data and augment each piece of that unlabeled data with meaningful tags that are informative. A CNN model or other AI/machine learning model built based upon training may then be used in real time to identify and classify objects in the environment of autonomous vehicle 120 based upon new sensor data received from sensors 110.

Planning subsystem 206 is configured to generate a plan of action for autonomous vehicle 120. The plan may comprise one or more planned actions or operations to be performed by autonomous vehicle 120. For example, the plan may comprise information identifying a trajectory or path to be traversed by autonomous vehicle 120. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 206 may include planned actions with respect to accessories of autonomous vehicle 120, such as turning indicators or lights on or off, producing one or more sounds (e.g., alarms), and the like. In situations where autonomous vehicle 120 has specialized components that are customized to perform specialized operations, the plan generated by planning subsystem 206 may also include planned actions to be performed by one or more of these specialized components. For example, if the autonomous vehicle is a digging truck with a bucket and arm assembly for performing the digging and moving of materials, the plan generated by planning subsystem 206 can include actions to be performed by the bucket and arm assembly for performing the digging. For example, the plan may include an angle at which the arm should be raised and or the angle of the bucket with respect to the arm. After a plan of action has been generated, planning subsystem 206 may communicate the plan of action to controls subsystem 208, which may then control one or more systems of vehicle systems 112 to cause the planned actions in the plan of action to be performed in a safe manner by autonomous vehicle 120.

In addition to the internal map generated by perception subsystem 204, planning subsystem 206 may also receive various other inputs that it uses in generating the plan of action for autonomous vehicle 120. These inputs may include, without limitation: (a) Position or localization information received from localization subsystem 202. (b) Information identifying one or more goals of autonomous vehicle 120 (e.g., information may be received identifying a final goal of autonomous vehicle 120 to make a right turn). The goal may be set by an end user or operator of the autonomous vehicle or machine. For an automotive example, the user may set a high level to drive from the current location of autonomous vehicle 120 to a particular final destination. Autonomous vehicle 120 may determine a GPS route plan based upon the current and final destination locations and with a goal to autonomously drive from the current location to the final destination according to the GPS route plan. In a mining environment example, a high level goal set by an operator may be to move ten tons of material (e.g., sand, coal, etc.) from point A and dump the material at point B. In general, one or more different goals may be provided. Examples of categories of goals (some of which may overlap) include, without limitation: goals related to performing an autonomous operation by the autonomous vehicle (e.g., autonomous driving or navigation along a path, scooping and dumping operations, moving materials or objects, lifting materials, driving, rolling, spreading dirt, excavating, transporting materials or objects from one point to another point, etc.), goals related to maneuvering the vehicle, goals related to interaction of the vehicle with various actors, objects, etc. in the vehicle's environment, goals related to the general operations of the vehicles, and the like. Examples of goals: changing lanes, driving from one location to another location, driving to a destination as fast as possible, making a turn, performing a series of steps in a sequence, and others. (c) High level route information regarding the path or route to be taken by autonomous vehicle 120. This may be provided directly or indirectly by an end user or operator of the autonomous vehicle. (d) Information identifying safety considerations. These may also be provided to the autonomous vehicle by an end user/operator, etc. using APIs provided by autonomous vehicle 120 or via metadata configured for autonomous vehicle 120. Examples of these considerations include, without limitation: always stay within the lane, maintain certain distance from any object at all time, a dump truck is not to make more than a 30 degree turn, a loader B is not to climb over a grade more than 15 degrees, etc. (e) Information about how a particular operation was performed in the past. For example, for a particular autonomous vehicle, this could be the past history of how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). For example, the autonomous vehicle traveled a path in the past, how a manual truck would have driven this path or completed a certain task, and the like. (f) Other inputs.

Based upon the one or more inputs, planning subsystem 206 generates a plan of action for autonomous vehicle 120. Planning subsystem 206 may update the plan on a periodic basis as the environment of autonomous vehicle 120 changes, as the goals to be performed by autonomous vehicle 120 change, or in general, responsive to changes in any of the inputs to planning subsystem 206.

As part of generating and updating the plan of action, planning subsystem 206 makes various decisions regarding which actions to include in the plan in order to achieve a particular goal in a safe manner. Processing performed by planning subsystem 206 as part of making these decisions may include behavior planning, global planning, path planning, fail-safe path, path history tracking, etc.

Planning subsystem 206 may use various AI-based machine-learning algorithms to generate and update the plan of action in order to achieve the goal of performing a function or operation (e.g., autonomous driving or navigation, digging of an area) to be performed by autonomous vehicle 120 in a safe manner. For example, in certain embodiments, planning subsystem 206 may use a model trained using reinforcement learning (RL) for generating and updating the plan of action. Autonomous vehicle management system 122 may use an RL model to select actions to be performed for controlling an autonomous operation of autonomous vehicle 120. The RL model may be periodically updated to increase its coverage and accuracy. Reinforcement learning (RL) is an area of machine learning inspired by behaviorist psychology, concerned with how agents ought to take actions in an environment so as to maximize some notion of cumulative reward.

In certain embodiments, in addition to generating a plan of action, planning subsystem 206 is capable of dynamically controlling the behavior of sensors 110. For example, planning subsystem 206 can send instructions or commands to a particular sensor from sensors 110 to dynamically control the sensor data that is captured by the particular sensor and/or control the sensor data that is communicated from the sensor to perception subsystem 204 (or to other subsystems of autonomous vehicle management system 122, such as to localization subsystem 202). Since the internal map built by perception subsystem 204 is based upon the sensor data received by perception subsystem 204 from the sensors, by being able to dynamically control the sensor data received from the sensors, the information included in and/or used by perception subsystem 204 to build and maintain the internal map can also be dynamically controlled by planning subsystem 206. Planning subsystem 206 can dynamically and on-demand direct sensors 110 to obtain specific types of information or behave in specified manners, for example, to provide additional sensor data to update the consistent internal map. For example, planning subsystem 206 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map is updated based on feedback from and under the control of planning subsystem 206.

Autonomous vehicle management system 122 provides an infrastructure that enables planning subsystem 206 (or other subsystems of autonomous vehicle management system 122) to send one or more instructions or commands to one or more sensors to control the behavior of those one or more sensors. In the embodiment depicted in FIG. 2A, sensors interface subsystem 210 provides an interface for interacting with sensors 110. In the outbound direction (from autonomous vehicle management system 122 to the sensors direction), planning subsystem 206 can send an instruction or command to sensors interface subsystem 210. Sensors interface subsystem 210 is then configured to communicate the received instruction to the intended destination sensor. In the inbound direction (from a sensor to autonomous vehicle management system 122), sensors interface subsystem 210 may receive sensor data from a sensor in response to the instruction sent from planning subsystem 206. Sensors interface subsystem 210 may then communicate the received sensor data to planning subsystem 206 (or to the appropriate subsystem of autonomous vehicle management system 122 which originated the instruction).

Sensors interface subsystem 210 may be capable of communicating with different sensors using one or more different communication protocols. In certain embodiments, in the outbound direction, for an instruction or command received from planning subsystem 206 (or from any other subsystem of autonomous vehicle management system 122) and to be sent to a particular sensor, sensors interface subsystem 210 may translate the instruction to a format that is understandable by and appropriate for communicating with that particular sensor and then use a particular communication protocol that is applicable for that particular sensor.

In certain embodiments, autonomous vehicle management system 122 may have access to information identifying sensors 110 and their capabilities. The subsystems of autonomous vehicle management system 122 may then access and use this stored information to determine the possible capabilities and behaviors of a sensor and to send instructions to that sensor to change its behavior. In certain embodiments, a sensor has to be registered with autonomous vehicle management system 122 before communications that enables between the sensor and autonomous vehicle management system 122. As part of the registration process, for a sensor being registered, information related to the sensor may be provided. This information may include information identifying the sensor, the sensor's sensing capabilities and behaviors, communication protocol(s) usable by the sensor, and other information related to the sensor. Autonomous vehicle management system 122 may then use this information to communicate with and control the behavior of the sensor.

As indicated above, planning subsystem 206 may send instructions to a sensor to control and change the sensor's behavior. Changes in a sensor's behavior can include changing the sensor data that is communicated from the sensor to autonomous vehicle management system 122 (e.g. the sensor data communicated from the sensor to perception subsystem 204, or other subsystems of autonomous vehicle management system 122), changing the data that is collected or sensed by the sensor, or combinations thereof. For example, changing the sensor data that is communicated from the sensor to autonomous vehicle management system 122 can include communicating more or less data than what was communicated from the sensor to autonomous vehicle management system 122 prior to receiving the instruction, and/or changing the type of sensor data that is communicated from the sensor to autonomous vehicle management system 122. In some instances, the data sensed or collected by the sensor may remain the same but the sensor data communicated from the sensor to autonomous vehicle management system 122 may change. In other instances, the data sensed or collected by the sensor may itself be changed in response to an instruction received from autonomous vehicle management system 122. Planning subsystem 206 may also be able to turn a sensor on or off by sending appropriate instructions to the sensor.

For example, planning subsystem 206 may receive inputs including a current internal map generated by perception subsystem 204, position information from localization subsystem 202, and a goal that autonomous vehicle 120 is to make a turn in a certain amount of time (e.g., a right turn in the next 5 seconds). As part of deciding what is the best set of actions to be taken by autonomous vehicle 120 to achieve the goal in a safe manner, planning subsystem 206 may determine that it needs particular sensor data (e.g., additional images) showing the environment on the right side of autonomous vehicle 120. Planning subsystem 206 may then determine the one or more sensors (e.g., cameras) that are capable of providing the particular sensor data (e.g., images of the environment on the right side of autonomous vehicle 120). Planning subsystem 206 may then send instructions to these one or more sensors to cause them to change their behavior such that the one or more sensors capture and communicate the particular sensor data to autonomous vehicle management system 122 (e.g., to perception subsystem 204). Perception subsystem 204 may use this specific sensor data to update the internal map. The updated internal map may then be used by planning subsystem 206 to make decisions regarding the appropriate actions to be included in the plan of action for autonomous vehicle 120. After the right turn has been successfully made by autonomous vehicle 120, planning subsystem 206 may send another instruction instructing the same camera(s) to go back to communicating a different, possibly reduced, level of sensor data to autonomous vehicle management system 122. In this manner, the sensor data that is used to build the internal map can be dynamically changed.

Examples of changes in a sensor's behavior caused by an instruction received by the sensor from autonomous vehicle management system 122 may include, without limitation:

Cause a sensor to reduce, or even shut off, sensor data that is communicated from the sensor to autonomous vehicle management system 122. This may be done, for example, to reduce the high volume of sensor data received by autonomous vehicle management system 122. Using the same example from above, where planning subsystem 206 receives an input indicating that a goal of the autonomous vehicle 120 is to make a right turn, planning subsystem 206 may decide that it requires reduced sensor data with respect to the left environment of autonomous vehicle 120. Planning subsystem 206 may then determine the one or more sensors (e.g., cameras) that are responsible for communicating the sensor data that is to be reduced. Planning subsystem 206 may then send instructions to these one or more sensors to cause them to change their behavior such that the amount of sensor data communicated from these sensors to autonomous vehicle management system 122 (e.g., to perception subsystem 204) is reduced. As an example, the instructions sent from the planning subsystem 206 may do one or more of the following:

Cause a sensor to change its field of view. For example, causing a camera or a LIDAR sensor to zoom in to a narrow location.

Cause a sensor to only send partial information. For example, the sensor may send less than all the information captured by the sensor.

Cause a sensor to send information faster or slower than before or than a regular rate.

Cause a sensor to turn on.

Cause a sensor to capture and/or send information to autonomous vehicle management system 122 at a different resolution or granularity then before.

Figure 2B:
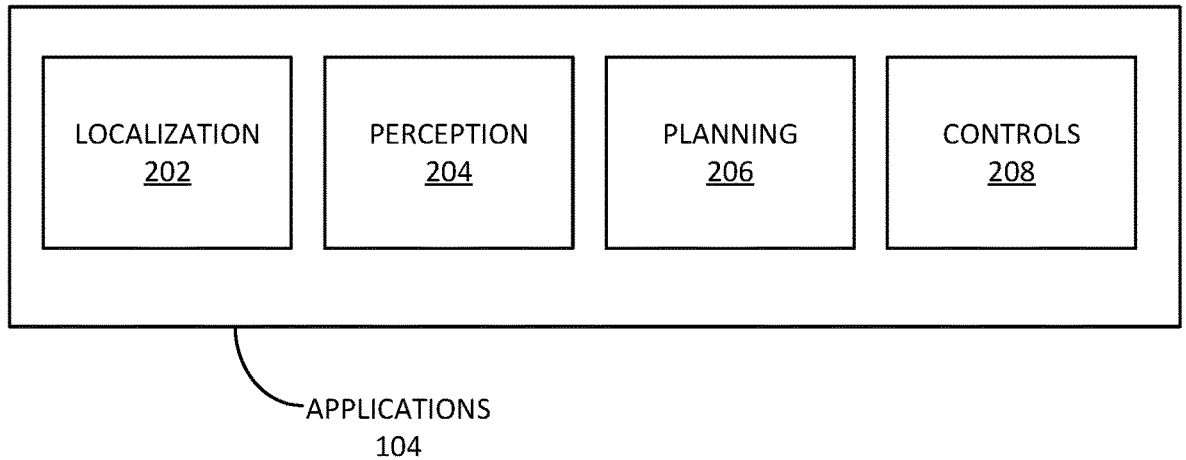
FIG. 2B illustrates software modules (e.g., program, code, or instructions executable by one or more processors of an autonomous machine) that may be used to implement the various subsystems of an autonomous vehicle management system according to certain embodiments.

FIG. 2B illustrates software modules (e.g., program, code, or instructions executable by one or more processors of autonomous vehicle 120) that may be used to implement the various subsystems of autonomous vehicle management system 122 according to certain embodiments. The software modules may be stored on a non-transitory computer medium. As needed, one or more of the modules or executable images of the modules may be loaded into system memory (e.g., RAM) and executed by one or more processors of autonomous vehicle 120. In the example depicted in FIG. 2B, software modules are shown for implementing localization subsystem 202, perception subsystem 204, planning subsystem 206, and controls subsystem 208.

Figure 4:
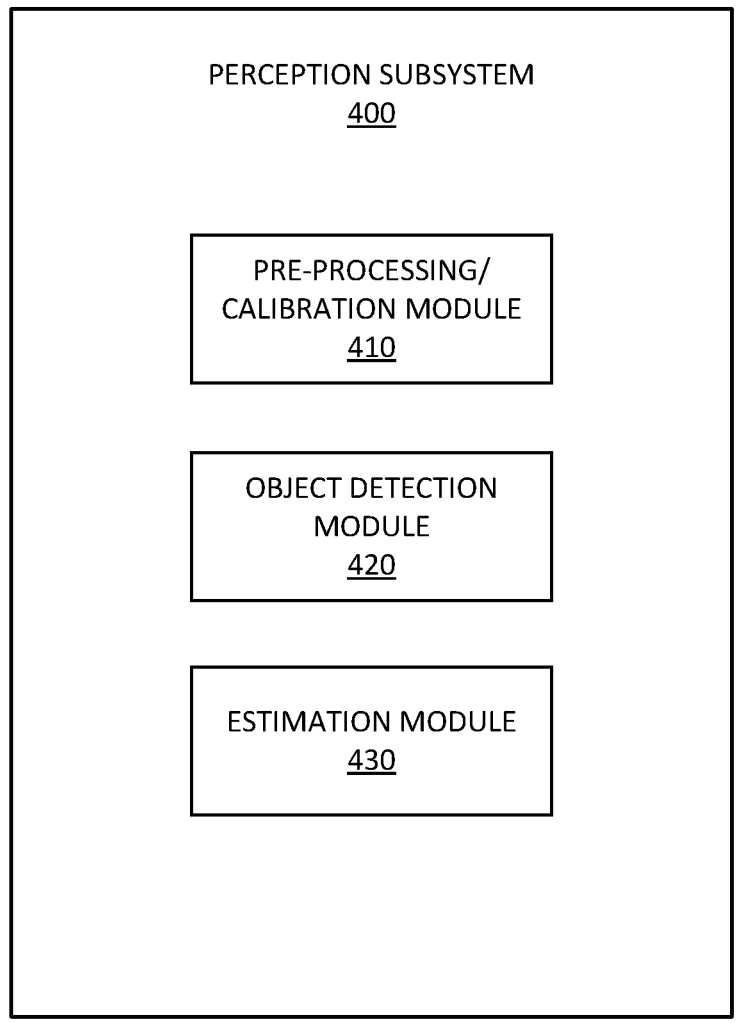
FIG. 4 is a simplified block diagram of a perception subsystem in an autonomous machine according to certain embodiments.

FIG. 4 is a simplified block diagram of a perception subsystem 400 in an autonomous machine (e.g., autonomous vehicle 120) according to certain embodiments. The perception subsystem 400 can be used to implement the perception subsystem 204 in FIG. 2A. As depicted in FIG. 4, the perception subsystem 400 may include a pre-processing module 410, an object detection module 420, and an estimation module 430. Each of the modules 410, 420, and 430 can be implemented in software only, hardware only, or combinations thereof. The perception subsystem 400 depicted in FIG. 4 is merely an example. One of ordinary skill in the art would recognize many possible variations, alternatives, and modifications. For example, in some implementations, perception subsystem 400 may have more or fewer subsystems or components than those shown in FIG. 4, may combine two or more subsystems, or may have a different configuration or arrangement of subsystems. Further, certain components of the perception subsystem have been intentionally omitted so as not to obscure the description of aspects of the perception subsystem which relate to volumetric estimation.

Pre-processing module 410 is configured to condition and/or reformat obtained sensor data in preparation for further processing by the object detection module 420. Formatting may involve transforming data produced by one sensor and data produced by a second sensor into a shared format and/or shared frame of reference. For example, sensors may capture data at different rates (e.g., two cameras capturing data at different frames per second, or a radar sensor operating at a different frequency than a LIDAR sensor). Thus, as part of the processing performed by the pre-processing module 410, data captured from sensors operating at different rates may be reformatted so as to enable the sensor data to subsequently be combined in a coherent manner, e.g., merging or grouping together of data captured by different sensors but corresponding to the same time period. As another example, sensors may be located at different places (e.g., different locations on a body of the autonomous vehicle) and/or oriented differently (e.g., two cameras pointed in slightly different directions for generating stereoscopic images). If a first sensor captures an object in a particular position and a second sensor captures the same object in different position (e.g., due a difference in the perspective of the second sensor relative to the first sensor), pre-processing module 410 may perform a geometric correction to ensure that the object is represented in the sensor data from both sensors as a single object and not two separate objects.

Conditioning of sensor data may involve any number of operations that improve the quality of the sensor data. The conditioning may vary depending on the type of sensor. For example, camera pre-processing may involve image size or resolution adjustments (e.g., to scale down a large image to a smaller size for faster downstream processing) and corrective image processing (e.g., lens correction, aberration correction, white balancing, aperture correction, and the like). Camera pre-processing may also involve combining different images into a single image (e.g., as an average of a set of images). Other types of conditioning operations include operations to eliminate noise or unneeded information (e.g., cropping of images, eliminating LIDAR data captured outside of a certain field of view, removing data corresponding to objects or regions that are not of interest (e.g., the ground), etc.).

Pre-processing module 410 may also be configured to perform calibration of sensors to change the sensor behavior and/to compensate for non-ideal sensor behavior. Examples of changing the behavior of a LIDAR or radar sensor include adjusting a reflectivity parameter to change the operating range of the LIDAR/radar sensor (e.g., to prevent capturing of data beyond a certain distance when an object of interest, such as pile, is known to be less than that distance away from the vehicle) and changing the field of view captured by the LIDAR/radar sensor (e.g., from 360 degrees to 270 degrees). An example of a corrective camera calibration is the estimation of parameters for a lens and/or image sensor in a camera to enable the estimated parameters to be used to correct for lens distortion during subsequent image capture. Thus, pre-processing can involve operations performed prior to capturing sensor data as well as post-capture operations. Calibration can include intrinsic calibrations (e.g., adjusting the behavior of a sensor based on data captured by the same sensor) and/or extrinsic calibrations (e.g., adjusting the behavior of a sensor based on data from another sensor).

In certain embodiments, calibration of a camera involves calculating an extrinsic matrix for the camera. The extrinsic matrix represents the camera's pose and is a transformation matrix comprising values indicating a geometric transformation (e.g., translation and/or rotation) needed to map the camera's frame of reference to some other frame of reference (e.g., the reference frame of a LIDAR sensor). The extrinsic matrix can be calculated as a 3×4 matrix using a checkerboard calibration technique, in which a 3D calibration rig featuring a checkerboard pattern is placed within view of the camera and then captured to determine matrix parameters that map a point or feature in the checkerboard image to a corresponding point or feature in the other frame of reference. For example, a corner of the calibration rig as represented in the checkerboard image can be mapped to a corner of the calibration rig as represented in a point cloud generated by a LIDAR sensor. The calculation of the extrinsic matrix can be performed as a one-time setup involving the use of a perspective-n-point (PnP) algorithm that estimates the camera pose given a set of n number of 3D points and their corresponding two-dimensional (2D) projections in a camera image. Once calculated, the extrinsic matrix can be used to combine data from a camera with data from another sensor, for example, to merge 2D camera images with 3D data from other sensors (e.g., LIDAR point clouds) or to merge 2D camera images from two different cameras to form a depth image based on a disparity between the camera images.

Object detection module 420 is configured to receive the pre-processed sensor data from the pre-processing module 410 and to determine which portions of the sensor data correspond to a pile of material or some other class of object. Object detection module 420 may partition sensor data into segments, where each segment is represented by an enclosed 2D or 3D boundary. For example, segmenting a 2D image captured by a camera may involve generating a border around a group of pixels based on determining that the pixels belong to the same object. Segmentation is typically performed concurrently with classification (determining the class of each segment). The process of dividing an input representation into segments of one or more classes is sometimes referred to as semantic segmentation. Semantic segmentation can be viewed as forming a mask by which the input representation is filtered, where the mask comprises shapes that are labeled according to the type of object to which the shape corresponds. LIDAR or radar data (e.g., a 3D point cloud) can also be segmented, for example, by generating a 3D surface (e.g. a geometric mesh) representing the boundaries of an object. Segmentation can be performed algorithmically (e.g., using a software algorithm that performs geometric calculations to generate a surface of polygons as a geometric mesh) or using a machine learning (ML) model trained to infer the boundaries of an object from sensor data.

Figure 7:
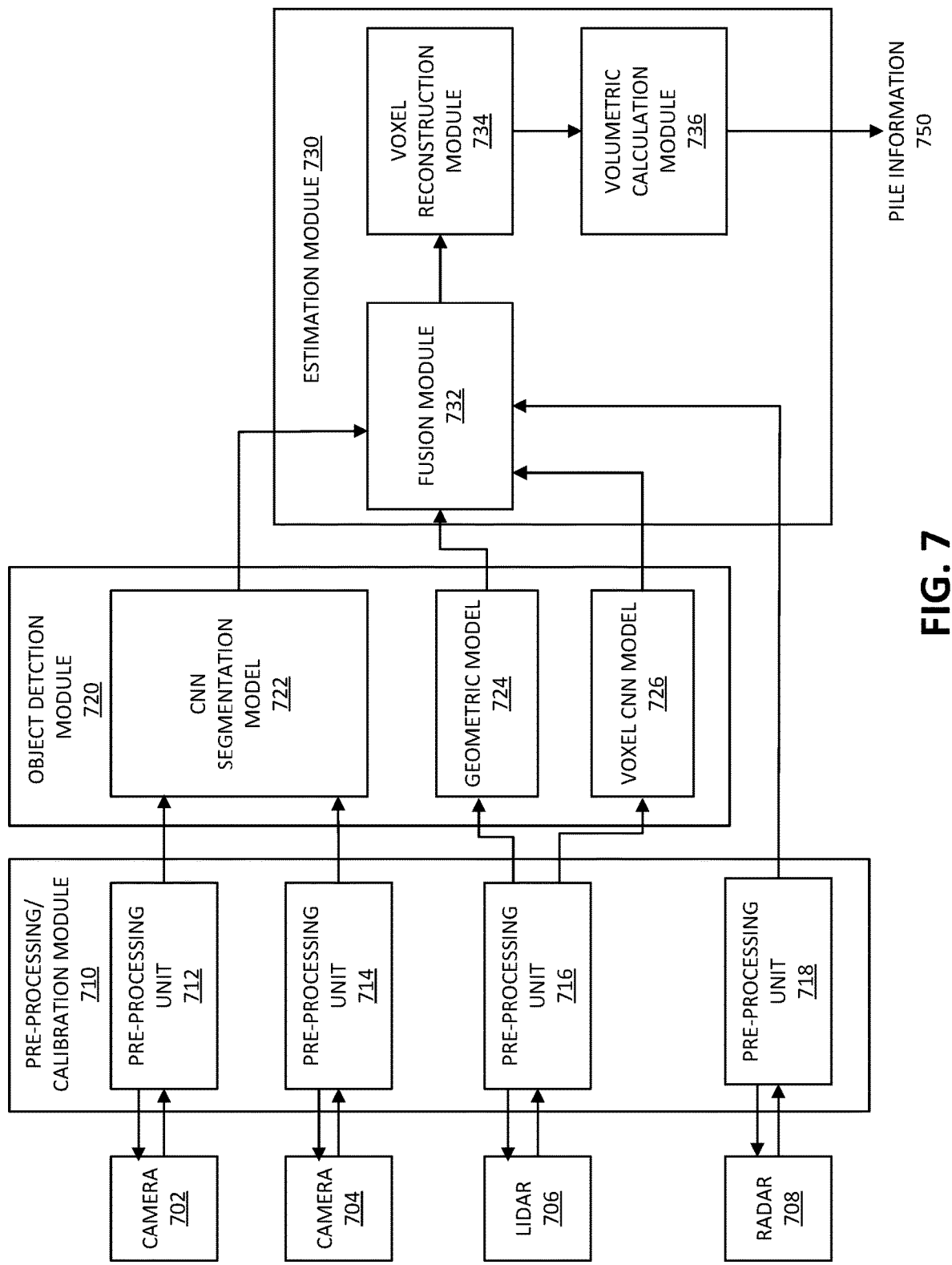
FIG. 7 illustrates an example method for detecting a pile of material and estimating its properties based on fusion of disparate representations of a physical environment and/or object in the physical environment, where the representations are generated using different types of sensors according to certain embodiments.

Object detection does not necessarily involve identifying every object captured in the sensor data. Instead, the objection detection module 420 can be configured to detect only objects of interest, such as piles of material. In certain embodiments, detection of objects of interest can be performed by an AI or ML model, for example, a CNN that has been trained to detect objects that are pile-shaped. The object detection module 420 can combine detection techniques, with different detection techniques being applied depending on the source of sensor data. For example, as described below in connection with the embodiments of FIGS. 7 and 10, multiple ML models can be used for detecting a pile of material from data captured using different types of sensors. In the embodiment of FIG. 7, a CNN segmentation model 722 performs segmentation of image data captured by one or more cameras to generate a segmented 2D image (e.g., an image representing a pile plus other objects in a physical environment), while a voxel CNN model 726 generates a voxel representation of an object of interest based on LIDAR data (e.g., a voxel representation of the same pile represented in the segmented image output by the CNN segmentation model 722).

Figure 5:
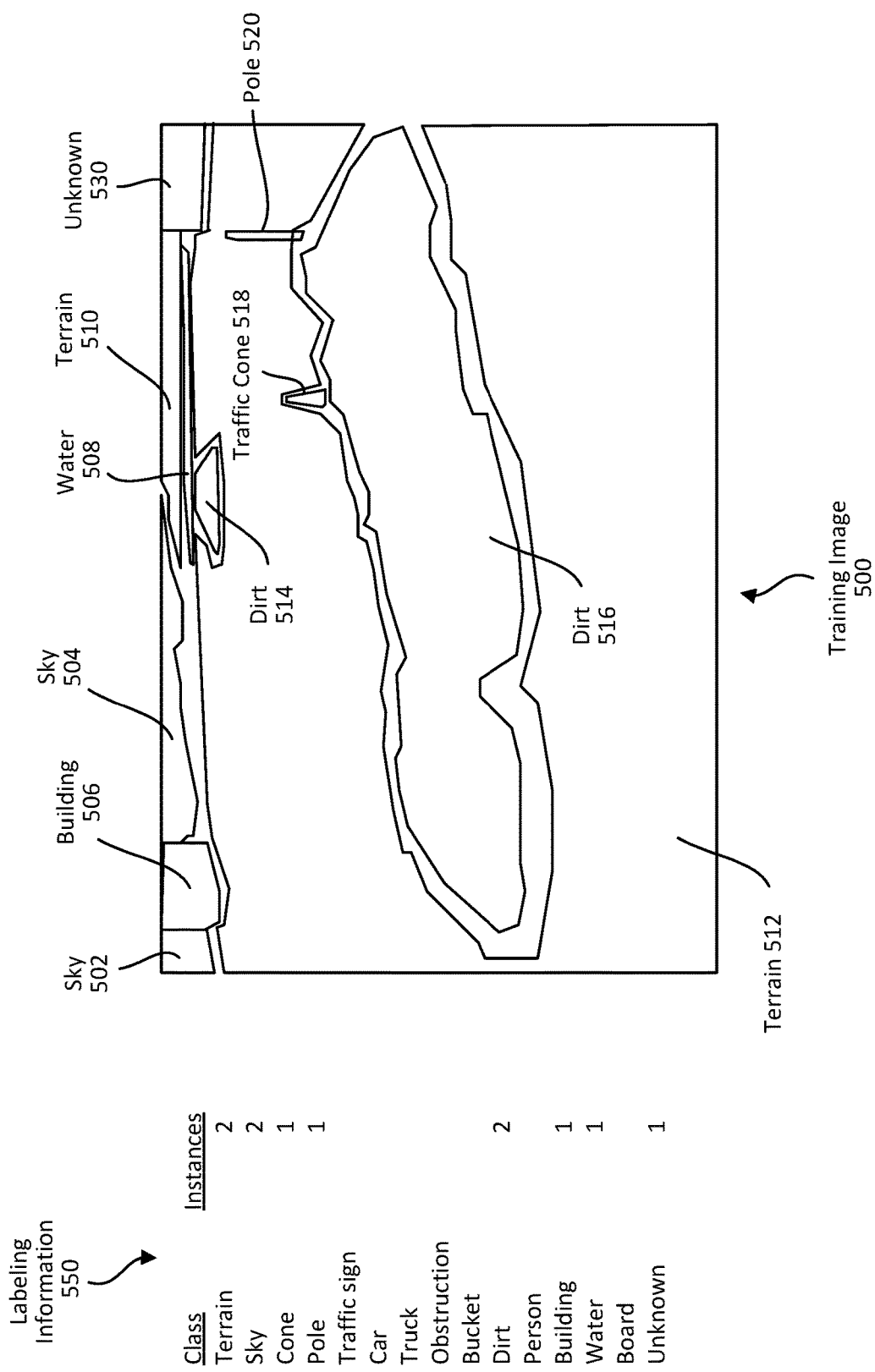
FIG. 5 illustrates an example training image usable for training a machine learning model to detect an object according to certain embodiments.

When performing segmentation, the object detection module 420 may classify segments according to a set of predefined categories or classes of objects. Examples of different types of classes are depicted in FIG. 5. The types of classes recognized by the object detection module 420 may vary depending on the environment in which the autonomous machine is deployed. For instance, an object detection module designed for mining equipment may be configured or trained to recognize segments that correspond to a pile of dirt, terrain (e.g., soil or grass), the sky, humans, mining vehicles, traffic cones, and the like.

Object detection module 420 generates one or more representations of a physical environment and/or an object of interest using sensor data received from the pre-processing module 410. For instance, object detection module 420 may generate a segmented 2D image as a substitute for a 2D camera image, where the pixels of the original 2D image are replaced with pixels corresponding to shapes defined by the borders identified during segmentation processing. The color values of the pixels in the segmented image may be set according to the class of the object. For example, the outline of a pile may be filled in with a color that is uniquely assigned to the pile class. In this manner, the original image can be simplified by removing extraneous visual information while making it easier to distinguish objects of different classes. In some embodiments, the color of the pixels in a segment may be kept substantially the same as in the original image, except that an outline is drawn around the border of the segment. The replacement image may be augmented with labels describing the objects (e.g., text or metadata describing the class of object). As another example, the object detection module 420 may generate a voxel representation of a pile using a LIDAR point cloud (e.g., a 3D stack of cubes approximating the shape of the pile as indicated by the points in the point cloud).

Estimation module 430 is configured to receive disparate representations from the object detection module 420 and to combine the disparate representations into a single representation for analysis by the estimation module 430 and/or as an output for downstream processing. For example, the estimation module 430 may generate a 3D representation of a pile from a segmented image and a voxel representation, where the 3D representation represents the geometry of the pile more accurately than either the segmented image or the voxel representation alone. In certain embodiments, the 3D representation generated by the estimation module 430 is a smoothed voxel representation or a digital elevation model (DEM) representing the surface of an object of interest (e.g., a pile). The 3D representation may comprise a grid of boxes and, for each box within the grid, information indicating the height of the box (e.g., the total number of voxels occupied between a ground surface and the top of the object at a particular location along the object's surface). In certain embodiments, the 3D representation generated by the estimation module 430 is used to update the internal map described earlier, in connection with the embodiment of FIG. 2a, as containing information about objects in the ego vehicle's environment as well as information about the state of the ego vehicle.

The estimation module 430 may use the 3D representation to estimate one or more characteristics of an object of interest. In certain embodiments, the processing performed by the estimation module 430 includes estimating the dimensions of a pile of material and, based on the estimated dimensions, estimating the volume of the pile. As part of estimating the characteristics of the object of interest, the estimation module 430 may, in some embodiments, determine a quality of the object. For instance, in a mining site, berms act as safety barriers and/or indicators of drivable areas (e.g., two berms placed opposite each other along a pathway). Berms are typically half the height of a mining vehicle and are ideally well-compacted without rounding of the top of the berm. A berm formed as a loose pile of dirt or a pile of dirt that is not of sufficient height can be a potential hazard to any vehicle or person that comes into contact with the berm, e.g., during an accidental crash or in an attempt to climb over the berm. Therefore, the estimation module 430 could output an indication as to whether a berm meets a minimum requirement (e.g., with respect to height or density). As another example, the estimation module 430 may include a machine learning model trained to distinguish fresh pile material from older pile material based on differences in LIDAR reflectance data. Therefore the estimation module 430 could output an indication as to the age of a pile or area within the pile. Thus, in addition to determining a value for the volume of the pile, the estimation module 430 may generate a quantitative and/or qualitative estimate for any number of other pile characteristics.

As indicated above, volumetric estimation and dimensional estimation of a pile of material can facilitate the performing of various tasks by an autonomous machine. For instance, estimation module 430 may communicate estimated characteristics of a pile and/or an indication of the quality of a pile to planning subsystem 206 in FIG. 2 to enable the planning subsystem 206 to generate a plan of action which may involve, for example, navigating around the pile, scooping a certain amount of material from the pile and moving the scooped material to another location, adding more material onto the pile, and the like. In some embodiments, the estimation module 430 communicates, to the planning subsystem 206, the 3D representation from which the pile characteristics were estimated. The 3D representation would enable the planning subsystem to take the geometry and/or location of the pile into consideration when formulating a plan of action. In certain embodiments, the estimation module 430 may be configured to communicate the estimated characteristics and/or 3D representation to another autonomous machine (e.g., to the perception subsystem of another autonomous vehicle nearby) to enable the other autonomous machine to perform one or more tasks based on such information.

In certain embodiments, object detection module 420 and estimation module 430 may be implemented on a high-speed compute platform for processing sensor data efficiently at a high throughput. For example, the sensors and the various computing resources (processors, memory, etc.) that form the object detection module 420 and the estimation module 430 may be coupled by one or more high-speed communication networks (e.g., Gigabit Ethernet) and may perform processing in a pipelined fashion so that sensor data is collected and processed in real-time.

In certain embodiments, the object detection module 420 includes one or more machine learning models. Each ML model in the object detection module 420 receives preprocessed sensor data as input. An ML model can receive one or more types of sensor data. For example, in the embodiment of FIG. 7, separate ML models are provided for camera data and LIDAR data. In the embodiment of FIG. 11, a single ML model receives camera, LIDAR, and radar data. The sensor data received by an ML model comprises a 2D or 3D representation of a physical environment as captured by a sensor. For example, the sensor data may comprise a 2D image generated by a camera or a 3D point cloud generated by a LIDAR sensor. An ML model can be trained to generate inferences based on the sensor data. For instance, an ML model may infer, from the color values of each pixel in a 2D image, which regions of the image correspond to a pile or other object of interest. The ML model may output the inferences in the form of an additional 2D or 3D representation, of the object alone or the object within the environment. For example, in certain embodiments, such as the embodiments of FIGS. 7 and 10, an ML model is trained to infer the boundaries of different classes of objects based on color information from a camera image, and to output a segmented image indicating the boundaries of each object detected by the ML model. Training generally involves providing a set of training representations as input to the ML model, comparing the resulting inferences to ground truth information corresponding to correct inferences, and adjusting the behavior of the ML model based on the difference between the actual inferences and the correct inferences.

FIG. 5 illustrates an example training image 500 (e.g., a photo of a real-world environment) usable for training a machine learning model to detect an object according to certain embodiments. The training image 500 is an example of two-dimensional training data. However, it will be understood that 3D training data (e.g., point clouds) can also be used for training when the machine learning model is to operate on 3D data. For example, a point cloud representing multiple types of objects could be used to train the ML model to recognize those types of objects. An ML model could also be trained on data representing single objects. For example, to train a CNN to detect piles, the CNN could be provided with point clouds in the shape of piles.

As depicted in FIG. 5, the training image 500 comprises labeled instances of various classes of objects, such as a first sky 502, a second sky 504, a building 506, water 508, a first terrain 510 (e.g., paved or unpaved ground), a second terrain 512, dirt 514 (e.g., a first pile of dirt), dirt 516 (e.g., a second pile of dirt), a traffic cone 518, a pole 520, and an unknown object 530. In the embodiment of FIG. 5, the dirt objects 514 and 516 are not explicitly labeled as being piles. However, in other embodiments, there may be a separate pile class, e.g., so that a pile of dirt is simultaneously labeled as being dirt and a pile. This would enable the ML model to differentiate between dirt that is pile shaped and dirt that is not pile shaped, e.g., loose dirt around the base of a pile. The training data can be chosen to include those types of objects which are expected to be encountered by the autonomous machine in which the machine learning model is to be deployed or used.

The training image 500 may be accompanied by information indicating borders of each object. For example, as depicted in FIG. 5, each object is annotated by an outline enclosing the object. In certain embodiments, the borders are represented as 2D polygons. In an 3D representation, borders can be represented as geometric meshes (e.g., a mesh of interconnected polygons) that define a 3D surface. Borders can also be indicated non-visually, for example, using metadata within a computer-readable file encoding the training image 500, where the metadata lists the coordinates of pixels corresponding to the border of an object.

The training image 500 is also accompanied by labeling information 550 that tags each object with a label indicating the object's class. As depicted in FIG. 5, the labeling information 550 may also include statistical information about the objects represented in the training image 500, e.g., a count of each object class. The labeling information 550 may be provided, for example, as metadata within the file of the training image 500 or as a separate file. In certain embodiments, the granularity of the labeling of training data is adjusted (e.g., labeling at a pixel level versus labeling at a macroblock level). For example, in order to reduce the amount of processing and the amount of training data, rough (less granular) labeling can be applied to the training data. Labeling that is too fine can potentially lead to overfitting of the machine learning model, whereas labeling that is too rough may lead to overgeneralization and thus poor fitting.

A machine learning model is typically trained on a large set of training data (e.g., thousands of images). Each item of training data (e.g., a training image) may be parsed for further processing by the machine learning model. For example, if the machine learning model is implemented as a neural network, relevant features from an item of training data may be extracted by the neural network or a separate machine learning model to generate a set of features for input to an input layer of the neural network. The machine learning model processes the values of these features to generate inferences regarding what the features represent. For example, the machine learning model may infer the probability that a pixel in the training image 500 corresponds to a particular object class based on the color values of the pixel. This classification result can then be compared to a ground truth classification (e.g., the labeled classes for the training image 500) and the behavior of the machine learning model can be adjusted according to the difference between the corresponding ground truth classification and the classification result generated by the machine learning model. For example, the difference may be back-propagated to adjust weights in one or more mathematical functions used by the machine learning model to generate the classification result. The machine learning model may calculate the extent of the adjustment so as to minimize a loss function representing this difference. In this manner, the machine learning model can be trained to classify objects, e.g., to recognize the presence of a pile of material in a newly observed (non-training) image.

The classification results produced by the machine learning model may be output in the form of a segmented representation. For example, the machine learning model may be configured to generate a 2D image in which borders are placed around each object as shown, for instance, in FIG. 6.

Training can be performed locally on a computing device or system in which the machine learning model will be deployed (e.g., one or more processors that form the perception subsystem 204 in FIG. 2). The computing device or system may include multiple general-purpose processors (e.g., a cluster of central processing units (CPUs)). Alternatively or additionally, because of the large amount of graphics-related computations performed by the machine learning model, the computing device or system may include special-purpose processors (e.g., a cluster of graphics processing units (GPUs)). These processors may operate in parallel to expedite the training of the machine learning model, for example, by processing different portions of the training data concurrently. In some embodiments, the training may be performed remotely, e.g., on a cloud server. Remote training can leverage additional computing resources beyond that which is available locally, and is therefore useful when the amount of training data to process makes it impractical to train locally.

In certain embodiments, training begins with the machine learning model being configured according to a pre-trained model. This enables the machine learning model to leverage existing capabilities derived through prior training efforts, e.g., training performed by other computing systems using training data different from that with which the machine learning model is to be trained. For example, there exists machine learning models that are configured to detect certain classes of objects (e.g., people, certain types of vehicles, buildings, etc.) which may be relevant to the general operation of an autonomous vehicle. Although such existing models are insufficient to provide the object detection and estimation functionalities described herein, such models can nevertheless be used as a starting point for training so that the training process is completed more rapidly. Thus, using a pre-trained model may expedite the rate at which the training converges to the final state of the machine learning model.

In certain embodiments, training data is presented to the machine learning model being trained in a particular order that is configured to achieve a balanced representation of object classes. For instance, training images can be selected so that there is at least a certain number of instances of a particular class of object in each image or over the course of several images. Further, the training images could be selected to maintain a certain ratio of an object class to another object class. Maintaining such class balance helps to avoid the problem of "forgetting" classes on which the machine learning model was earlier trained due to a disproportionate amount of another object class being present in later training data. For example, a neural network that is initially trained exclusively on piles would tend to perform well in regard to the detection of piles, but once the neural network is no longer provided with training instances of piles or provided with too few instances of piles, the performance of the neural network with respect to piles may start to degrade as the neural network attempts to configure its behavior for other classes (e.g., terrain) represented in later training data. Providing a balanced representation of object classes enables the machine learning model to perform well in a variety of settings since real-world environments are rarely composed of just one type of object.

To determine when to end training, the machine learning model can be tested by inputting validation data to the machine learning model and comparing the results generated by the machine learning model to ground truth information for the validation data. For instance, the validation data may comprise a subset of a pool of training data, where the subset is set aside for validation rather than training purposes. Training and validation can be performed in separate phases. In certain embodiments, the training phase and the validation phase are terminated based on determining that the machine learning model has reach a certain level of accuracy. For example, the accuracy of predictions/inferences for a particular object class or for the entire set of object classes can be specified as a threshold value (e.g., average classification error). The thresholds therefore correspond to performance criteria. Threshold values for validation can, but need not, be the same as threshold values for training. Once the results generated by the machine learning model satisfy this performance criteria, training can be terminated. Otherwise, the machine learning model may be subjected to further training using additional training data.

Figure 6:
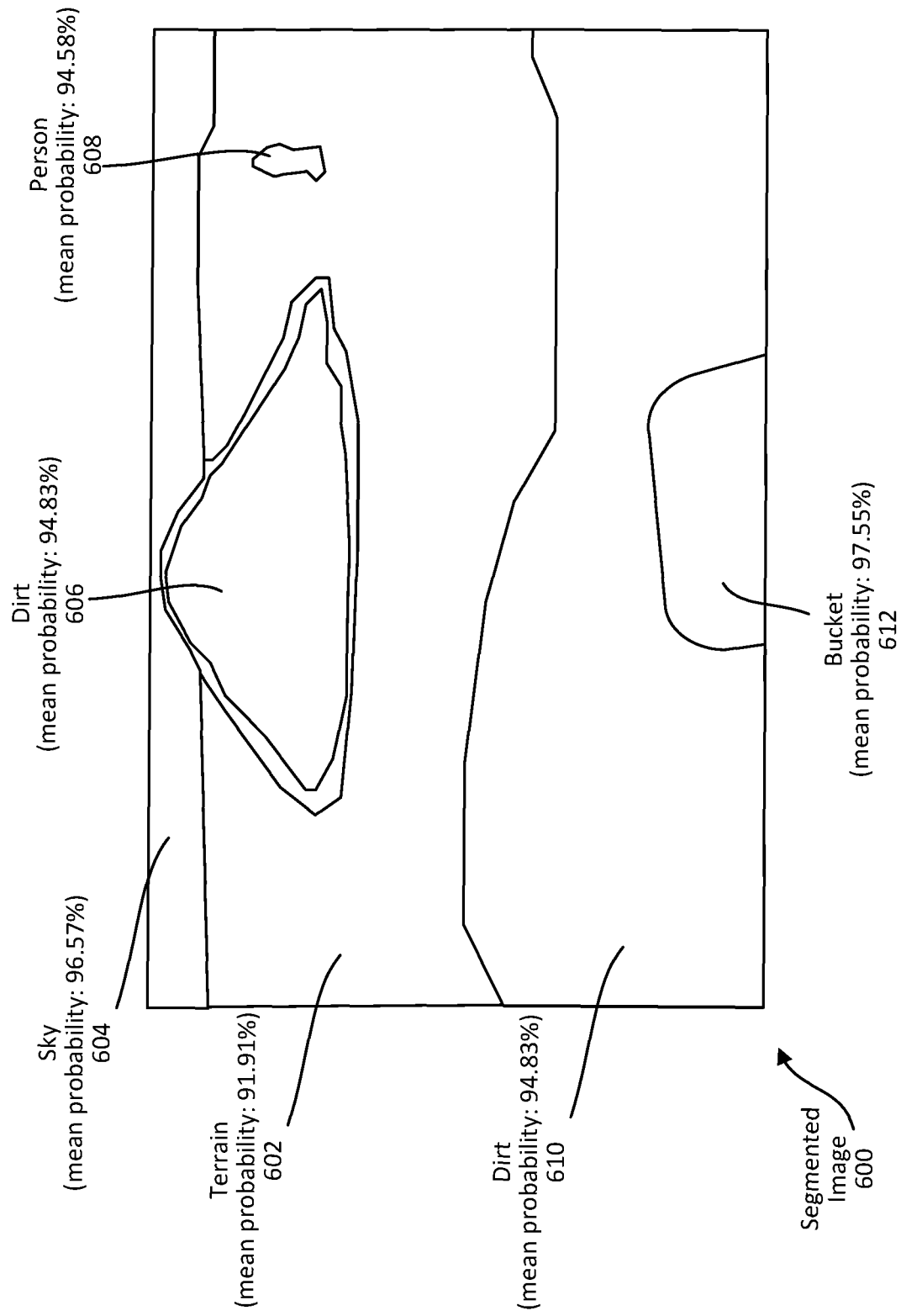
FIG. 6 illustrates an example segmented image generated by a trained machine learning model according to certain embodiments.

FIG. 6 illustrates an example segmented image 700 generated by a trained machine learning model according to certain embodiments. The segmented image 700 represents a 2D image generated by a machine learning model that has been trained using training data representing the various object classes depicted in FIG. 6. The segmented image 700 may be generated from an input image (e.g., an image that was captured by a camera and then pre-preprocessed to correct and/or reformat the image). As depicted in FIG. 6, the segmented image 700 is segmented into different regions corresponding to a terrain 602, a sky 604, a pile of dirt 606, a person 608, a second instance of dirt 610 (e.g., a dirt pit), and a bucket 612 that forms part of an autonomous vehicle on which the sensor that captured the input image is mounted. For each segment, the machine learning model may have determined (e.g., through inferencing) a probability (e.g., a mean probability) that the object represented by that segment belongs to a particular class. As indicated earlier, a segmented image can be used as a substitute for an image from which the segmented image was generated, and may employ a particular color scheme (e.g., with a unique color for each object class) that permits objects to be readily distinguished. Segmentation may involve semantic segmentation (e.g., so that objects of the same class are labeled without necessarily distinguishing different instances of the same class) and/or instance segmentation (e.g., so that different instances of the same class are individually labeled: e.g., pile #1, pile #2, etc.).

FIG. 7 illustrates an example method for detecting a pile of material and estimating its properties based on fusion of disparate representations of a physical environment and/or object in the physical environment, where the representations are generated using different types of sensors according to certain embodiments. The method of FIG. 7 is depicted with reference to a particular arrangement of components on which the method can be implemented. As depicted in FIG. 7, these components may include a plurality of sensors (e.g., a camera 702, a camera 704, a LIDAR sensor 706, and a radar sensor 708), a pre-processing module 710, an object detection module 720, and an estimation module 730. The number of sensors can vary. For instance, in some embodiments, there may only be one camera (e.g., a single camera and a single LIDAR sensor, but no radar) or even no cameras (e.g., a LIDAR sensor plus a radar sensor, or an imaging radar sensor without any LIDAR or camera sensors).

Pre-processing module 710 may correspond to the pre-processing module 410 in FIG. 4. Each of the sensors is communicatively coupled to a respective pre-processing unit in the pre-processing module 710. For example, camera 702 may be configured to provide image data to a pre-processing unit 712, camera 704 may be configured to provide image data to a pre-processing unit 714, LIDAR sensor 706 may be configured to provide LIDAR data to a pre-processing unit 716, and radar sensor 708 may be configured to provide radar data to a pre-processing unit 718. As described earlier in connection with the embodiment of FIG. 4, pre-processing may involve various post-capture and/or pre-capture operations for conditioning or formatting data from different sensors, as well as for calibrating the sensors. For the sake of brevity, the description of pre-processing is not repeated in the discussion of FIG. 7.

Object detection module 720 may correspond to the object detection module 420 in FIG. 4. Object detection module 720 includes CNN segmentation model 722, a geometric model 724, and voxel CNN model 726. CNN segmentation model 722 and voxel CNN model 726 are examples of machine learning models implemented as neural networks. However, other types of machine learning models (e.g., models implementing using a different type of neural network) can also be used in place of the CNNs in FIG. 7.

CNN segmentation model 722 receives pre-processed data generated by pre-processing unit 712 using data from the camera 702. The pre-processed camera data may include a 2D image. The CNN segmentation model 722 is configured (e.g., trained) to segment the 2D image and classify objects contained in the 2D image to provide, as input to a fusion module 732 of the estimation module 730, a segmented version of the 2D image. For example, CNN segmentation model 722 may output an RGB (red, green, blue) formatted 2D image that has been segmented and labeled with the classes of each object identified in the 2D image received from the pre-processing unit 712. Similarly, CNN segmentation model 722 may generate a segmented image based on an image derived from operations performed by the pre-processing unit 714 on data from camera 704.

Geometric model 724 and voxel CNN model 726 both receive pre-processed data generated by the pre-processing unit 716 using the output of LIDAR sensor 706. The output of the pre-processing unit 716 may include, for example, a point cloud represented in a 3D coordinate system. Geometric model 724 is configured to perform geometric processing to segment the pre-processed LIDAR data using computer vision techniques. The segmentation performed by the geometric model 724 can be implemented algorithmically, e.g., using one or more software algorithms that distinguish between points associated with volumes (e.g., 3D objects) and points not associated with volumes (e.g., flat terrain). Thus, the geometric model 724 does not have to be trained to perform segmentation. Instead, geometric model 724 may simply generate geometric meshes by, for example, drawing a polygon surface, using polynomial fitting and Poisson surface reconstruction through points that have certain geometric relationships with each other. In certain embodiments, the output of the geometric model 724 comprises a geometric mesh that defines, within a 3D coordinate system, a 2D plane corresponding to the ground. As explained below in connection with FIG. 8, the ground plane can be used to determine a 3D volume (enclosed shape) from which the volume of a pile is estimated.

Voxel CNN model 726 receives pre-processed data generated by pre-processing unit 716 using data from the LIDAR sensor 706. The pre-processed LIDAR data may include a 3D representation of a physical environment (e.g., a point cloud in an x, y, z coordinate system). The voxel CNN model 726 is configured (e.g., trained) to detect any piles represented in the pre-processed LIDAR data to provide, as an input to the fusion module 732 of the estimation module 730, a voxel representation of each pile detected in the pre-processed LIDAR data. For example, the voxel CNN model 726 may have been trained using point cloud data representing pile shaped objects. Based on this training, the voxel CNN model 726 infers, using features extracted from the pre-processed LIDAR data, the general boundaries of each pile shaped object. Thus, the voxel representation is a rough approximation of the shape of the pile in 3D space. The voxel CNN model 726 may or may not be able to distinguish between two pile shaped objects (perform instance segmentation). For example, the voxel CNN model 726 may simply be trained to output a voxel representation of any pile shaped objects detected. In the case of multiple piles, the voxel representation output by the voxel CNN model 726 could be a composite of multiple, pile shaped voxel groups.

Although not depicted as being coupled to a machine learning model, the output of the pre-processing unit 718 associated with radar sensor 708 may, in some embodiments, be processed through a machine learning model trained to detect piles and/or other objects from the pre-processed radar data. For example, a separate voxel CNN model may be provided for generating, as an input to the fusion module 732, a voxel representation of a pile based on a point cloud generated using the radar sensor 708.

Estimation module 730 may correspond to estimation module 430 in FIG. 4. Estimation module 730 includes, in addition to the fusion module 732, a voxel reconstruction module 734 and a volumetric calculation module 736.

Fusion module 732 is configured to combine the various pieces of 2D and 3D information supplied by the CNN segmentation model 722, the geometric model 724, and the voxel CNN model 726 into a single 3D representation of an object, e.g., a colorized voxel representation of a pile. The 3D representation generated by the fusion module 732 provides more information about the object than any of the input representations provided to the fusion module. For instance, the fusion module 732 may combine color information from the segmented 2D image with shape information from the voxel representation. Fusion may involve, for example, determining the color across the surface of the object by projecting 3D data onto 2D data, e.g., from the plane of LIDAR sensor 706 to the plane of camera 702 and projecting from the 2D data back to the 3D data. This enables the fusion module 732 to better determine the boundaries of the pile/object based on recognition that voxels which map onto certain colors should not be considered to be part of the pile/object. For example, a person standing next to a pile could be lumped into a set of voxels derived from a LIDAR point cloud and, based on color differences between the person and the pile, the voxels associated with the person could be excluded from the voxel representation of the pile. The fusion module 732 can also incorporate the output of the geometric model 724 and/or the pre-processed radar data into the combined 3D representation.

The 3D representation generated by the fusion module 732 is refined by the voxel reconstruction module 734 to generate a more accurate 3D representation of a pile or other object of interest. In certain embodiments, the voxel reconstruction module 734 reconstructs, based on the 3D representation generated by the fusion module 732, an object of interest (e.g. a pile) as a smooth surface with bounded edges, for example, the pile surfaces shown in FIGS. 8 and 9. The reconstruction can be performed using techniques similar to those described above in connection with the geometric model 724. For example, the voxel reconstruction module 734 may reconstruct a pile by fitting a mesh over the voxels in the 3D representation generated by the fusion module 732. The mesh operates to make the transitions between adjacent locations on the surface of the pile more gradual. The mesh also fills in any holes that are in the 3D representation (e.g., hollow areas on the surface of the pile due to noise, sensor error, incorrect inferencing by CNN segmentation model 722 or voxel CNN model 726, and the like). The output of the voxel reconstruction module 734 is a smooth, colorized and 3D representation of the object of interest.

Figure 9:
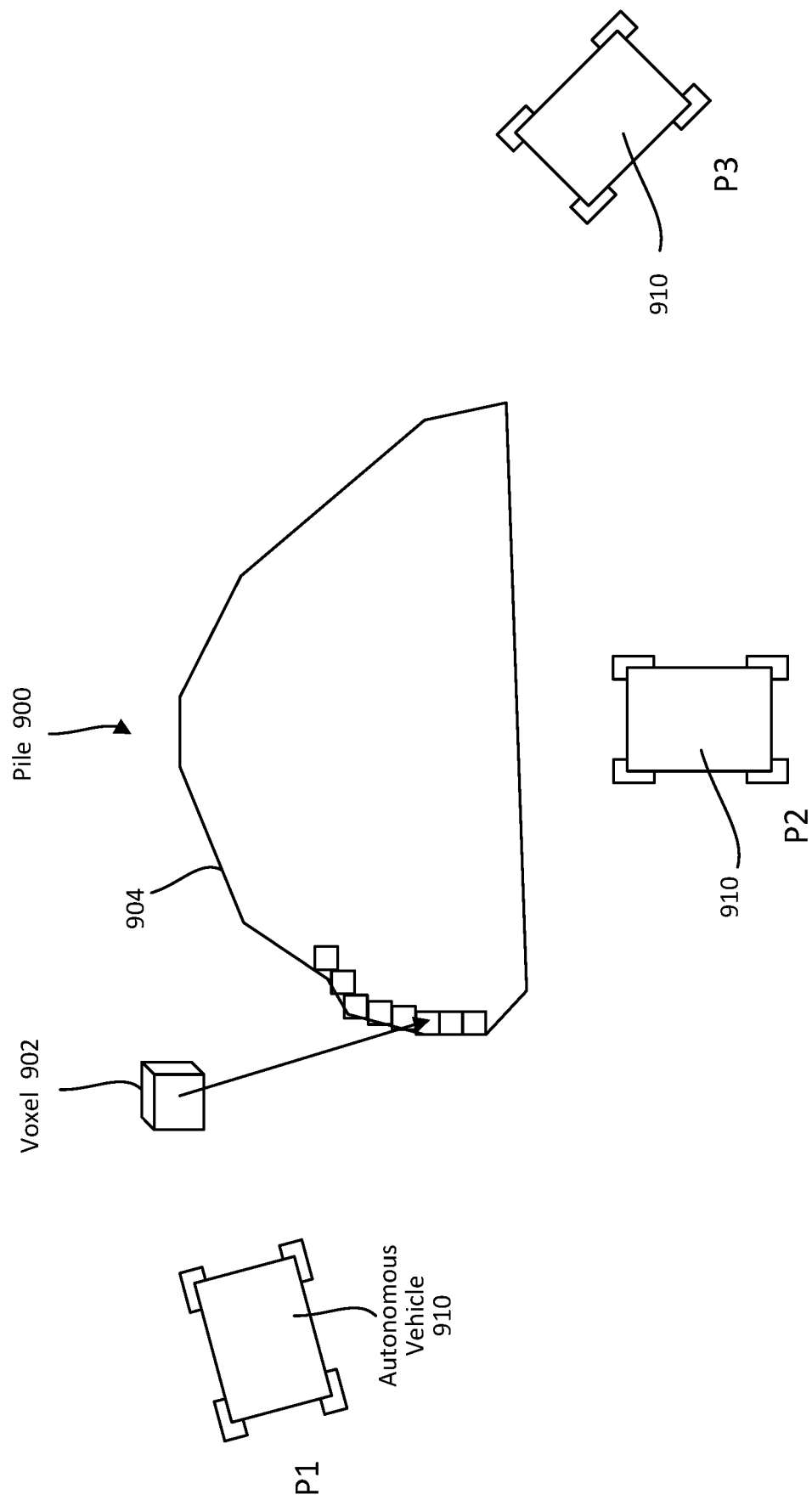
FIG. 9 illustrates example an example method for reconstructing a pile of material according to certain embodiments.

FIG. 9 illustrates an example method for reconstructing a pile according to certain embodiments. As depicted in FIG. 9, once the dimensions and boundaries of a pile 900 have been determined in the form of a voxel representation comprising a plurality of voxels 902 (only a portion of the voxels is shown in the figure for simplicity), a smooth surface 904 can be defined to better approximate the shape of the pile and to fill in any holes in the voxel representation, as explained above.

Additionally, as depicted in FIG. 9, in certain embodiments, a pile is reconstructed based on sensor data captured from different perspectives. For instance, the sensor data may be captured from an autonomous vehicle 910 in different positions (e.g., positions P1, P2, and P3) around the pile. Obtaining sensor data from different positions (e.g., a range of positions spanning 270 degrees or more) enhances the accuracy of the volumetric estimation because more information about the pile 900 is made available. For example, it may be determined that the pile 900 is hollow, asymmetric, or discontinuous on a side facing the sensors when the autonomous vehicle 910 is in position P3, whereas from the perspective of positions P1 and P2, the pile 900 may appear to be completely solid, symmetric, and continuous. The various views of the pile 900 captured at different positions may be combined (e.g., by stitching together images of the pile, aggregating point clouds, and the like). In certain embodiments, such as the embodiment of FIG. 7, the combining of different views may be performed by an estimation module (e.g., the fusion module 732 in estimation module 740). The reconstruction and multi-view data capture techniques depicted in FIG. 9 may be applied to any of the estimation methods described herein, including the methods described below in connection with the embodiments of FIGS. 10 and 11. In certain embodiments, combining of sensor data from different perspectives is performed using a long short term memory (LSTM) neural network. The LSTM receives multiple sets of sensor data, each set of sensor data captured from a particular perspective and comprising data from a plurality of sensors. The LSTM generates a 3D representation of the pile/object and updates the 3D representation each time a new set of sensor data is input to the LSTM.

Returning to FIG. 7, the volumetric calculation module 736 is configured to estimate the volume of the object of interest (e.g., the pile 900 in FIG. 9) based on the 3D representation generated by the voxel reconstruction module 734. The volumetric estimation performed by the volumetric calculation module 736 may involve, for example, slicing the 3D representation generated by the voxel reconstruction module 734 into a plurality of 3D slices, and calculating a volume integral over each of the slices based on how many voxels fit within each slice, where each voxel represents a certain physical volume (e.g., a two-cubic centimeter cube).

As depicted in FIG. 7, the volumetric calculation module 736 may output pile information 750 (e.g., to planning subsystem 206 in FIG. 2). The pile information 750 can include the estimated volume of the pile, along with other information determined by the estimation module 730 (e.g., the estimated dimensions of the pile, the 3D representation generated by the voxel reconstruction module 734, and the like). The pile information 750 may be used to generate a plan of action with respect to the pile, for example, to drive around the pile, remove a certain amount of material from the pile, and so on.

Figure 8:
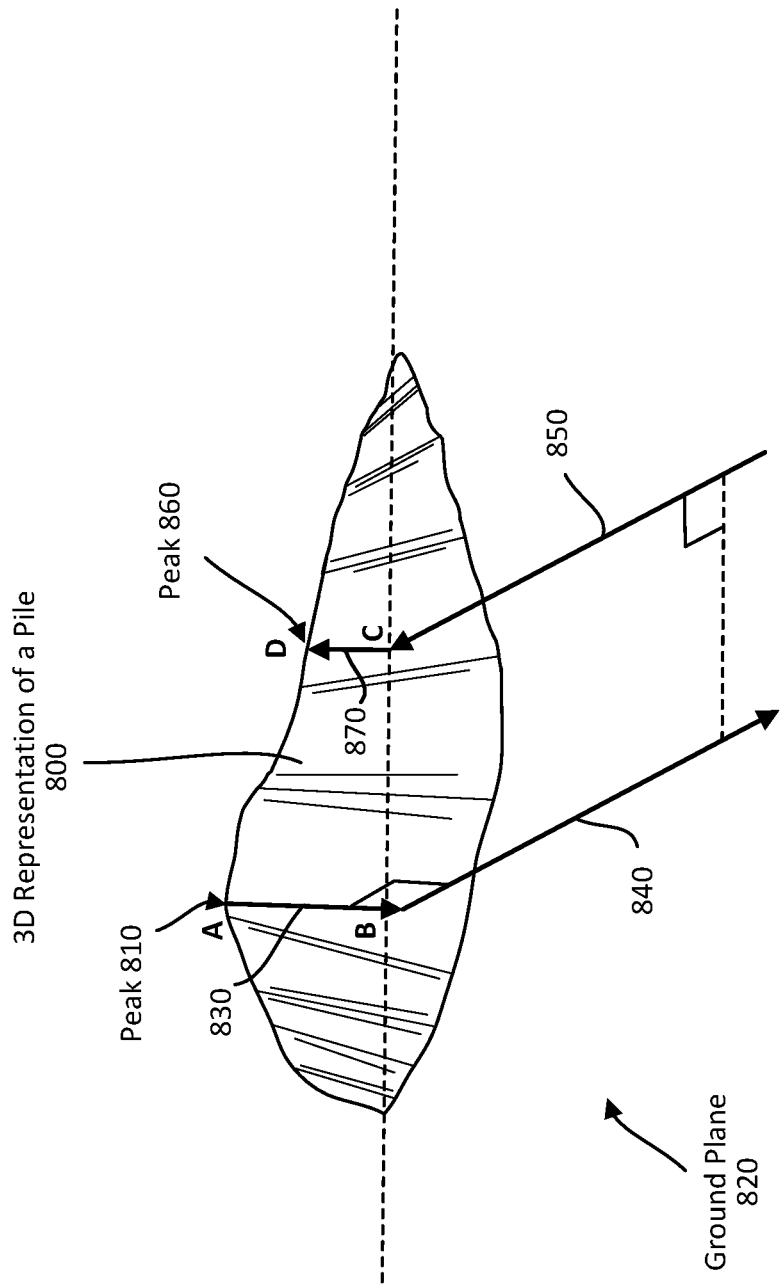
FIG. 8 illustrates an example method for estimating the volume of a pile of material based on a 3D representation of the pile according to certain embodiments.

FIG. 8 illustrates a method for estimating the volume of a pile of material based on a 3D representation of the pile (e.g., the 3D representation generated by the voxel reconstruction module 734) according to certain embodiments. The method depicted in FIG. 8 is not limited to the embodiment of FIG. 7, but can also be used to implement volumetric estimation in other embodiments, for example the embodiment of FIG. 10. As depicted in FIG. 8, a 3D representation 800 of a pile (e.g., a smooth 3D representation generated by voxel reconstruction module 734) can be divided roughly in half by locating a plane through points A, B, C, and D. The method of FIG. 8 assumes that the pile is continuous and symmetric about the ABCD plane so that the back half of the pile has the same volume as the front (sensor facing) half. Whether or not the pile is symmetric or has any irregularities on one side can be determined by collecting sensor data from different perspectives, for example, according to the method depicted in FIG. 9. However, assuming that sensor data from only one side is available, the volume of the pile can be estimated to be twice that of the "half" volume.

The boundaries of the half volume can be determined as follows. First, a 2D plane 820 representing the ground surface is determined. The ground plane 820 can be identified through geometric processing performed, for example, by the geometric model 724 in FIG. 7.

Next, a peak 810 (point A) along the top surface of the pile is determined. The peak 810 may correspond to a global maximum (e.g., the highest point) or a point defined by a set of highest points (e.g., the average of a certain number of highest points). Since the 3D representation 800 describes in detail the contours of the pile, determining the peak 810 is relatively straightforward.

The peak 810 is then projected onto the ground plane 820. For example, as depicted in FIG. 8, a line 830 orthogonal to the ground plane 820 can be determined to identify point B as corresponding to the intersection of the line 830 and the ground plane 820.

The point B where the line 830 intersects the ground plane 820 is then projected onto a sensor plane (e.g., a plane of a camera or LIDAR sensor) to determine where the point B intersects with the sensor plane. This forms a line 840 along the ground plane 820.

Next, a line 850 parallel to the line 840 is determined by projecting from the sensor plane back to the 3D representation 800 to identify point C inside the 3D representation 800. The line 850 is parallel to line 840 and lies in the ground plane 820. The distance between points B and C can vary. In general, there are no restrictions on the placement of point C so along as point C lies within the enclosed volume of the 3D representation of the pile.

After the point C has been identified, another peak 860 (corresponding to point D) is identified by projecting the point C upwards to form a line 870. A plane extending through all four points A, B, C and D is then determined. This plane corresponds to the back of the observable half of the pile. The observable half is represented by a 3D volume bounded by: (1) the ground plane 820, (2) the back plane ABCD, and (3) the 3D representation 800. These three elements define a convex hull or shell corresponding to the outer surface of the observable half. A partial volume of the pile can then be estimated, e.g., by determining, based on knowledge of the contours of the convex hull and the distance represented by a voxel, the total number of voxels between the ground plane 820 and the top of the pile at various locations, then calculating a volume value based on the total number of voxels, and multiplying the volume value by two. The total number of voxels between the ground plane 820 and the top of the pile at any given point represents the height of the pile and can be expressed as a fraction or decimal since the top of the pile is not necessarily aligned with the edge of a voxel at every location along the top of the pile.

Although FIG. 8 shows the back plane as being formed by four points ABCD, in practice, the back plane may be determined by identifying multiple C and D points on both sides of the AB line. For example, a point C' and a corresponding peak D' located to the left of line 830 could be identified to extend the plane toward the left corner of the pile. This can be repeated to identify additional points until a plane that cuts through the entire length of the pile is identified.

Figure 10:
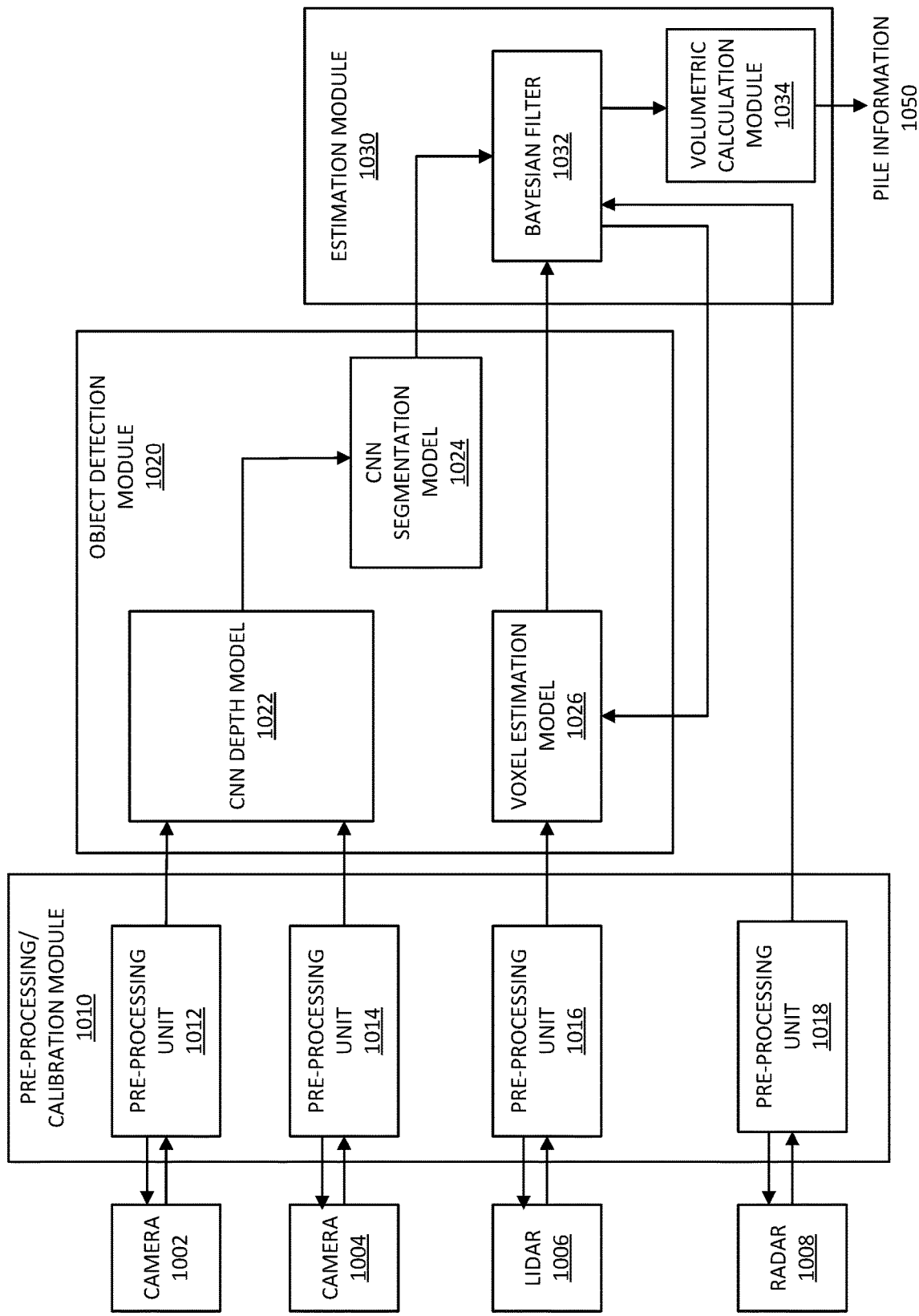
FIG. 10 illustrates an example method for detecting a pile of material and estimating its properties using a Bayesian filter that generates feedback for adjusting a machine learning model according to certain embodiments.
Figure 11:
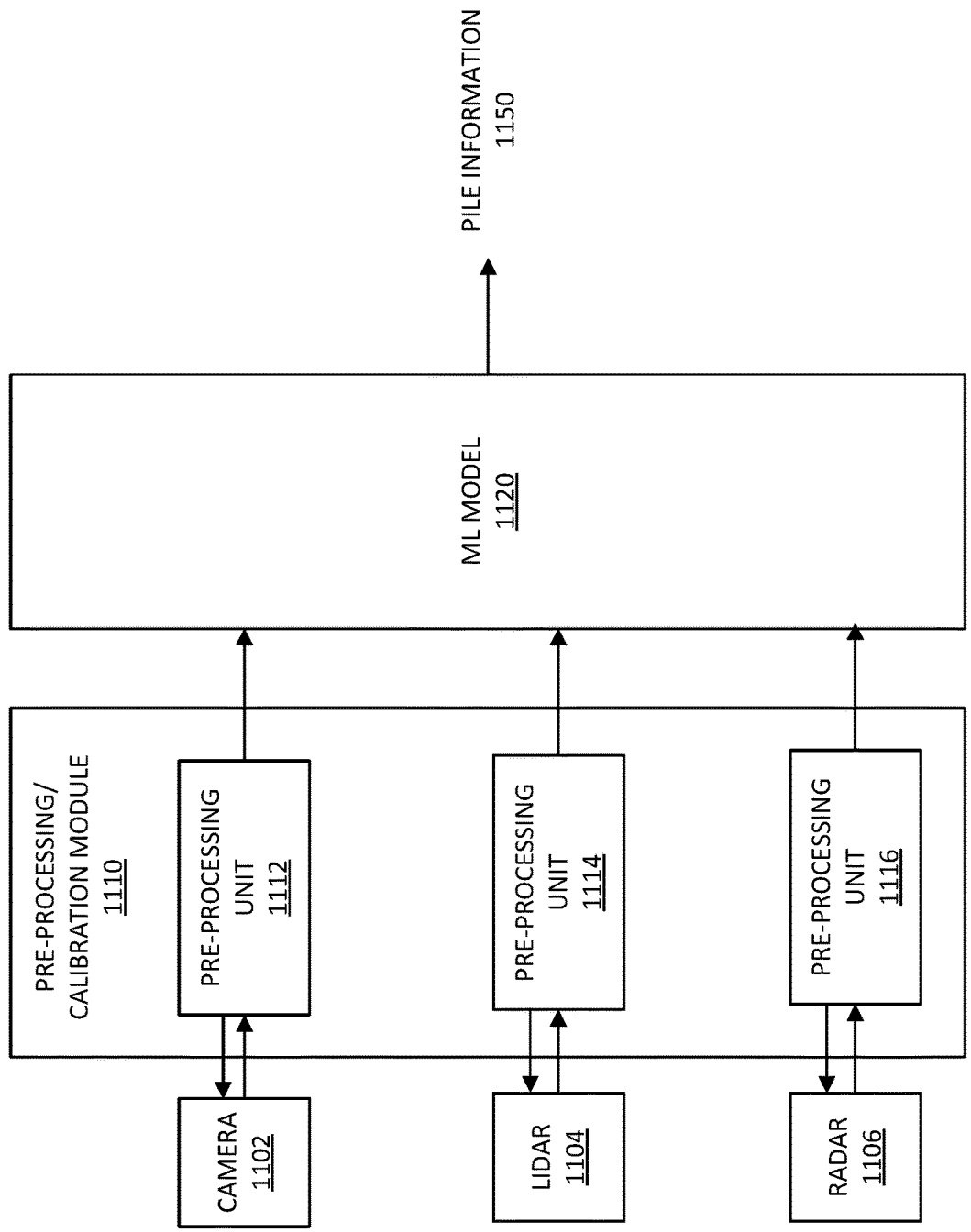
FIG. 11 illustrates an example method for detecting a pile of material and estimating its properties using a single machine learning model according to certain embodiments.

FIG. 10 illustrates an example method for detecting a pile of material and estimating its properties using a Bayesian filter that generates feedback for adjusting a machine learning model according to certain embodiments. The method of FIG. 10 is depicted with reference to a particular arrangement of components on which the method can be implemented. As depicted in FIG. 10, these components may include a plurality of sensors (e.g., a camera 1002, a camera 1004, a LIDAR sensor 1006, and a radar sensor 1008), a pre-processing module 1010, an object detection module 1020, and an estimation module 1030.

Cameras 1002 and 1004 are analogous to the camera 702 and the camera 704 in FIG. 7, respectively. The number of sensors can vary, however, there are at least two camera sensors (e.g., the cameras 1002 and 1004) in the embodiment of FIG. 10. The at least two camera sensors are placed in different locations, and possibly at different angles, to simultaneously capture the environment from different perspectives. This enables images captured by the at least two cameras to be processed to determine depth information based on the difference in the perspectives of the camera sensors. In some embodiments, two camera sensors are integrated into a single camera body to form a stereoscopic camera device.

LIDAR sensor 1006 and radar sensor 1008 are analogous to the LIDAR sensor 706 and the radar sensor 708 in FIG. 7, respectively.

Pre-processing module 1010 is analogous to the pre-processing module 710 in FIG. 7 and includes a pre-processing unit 1012, a pre-processing unit 1014, a pre-processing unit 1016, and a pre-processing unit 1018, which are analogous to the pre-processing units 712, 714, 716, and 718, respectively. For the sake of brevity, the functionality and operation of the sensors and pre-processing units depicted in FIG. 11 are not described. Instead, it will be understood that the sensors and pre-processing units may incorporate the same features as described earlier with respect to the corresponding sensors and processing units in FIG. 7.

Object detection module 1020 includes a CNN depth model 1022, a CNN segmentation model 1024, and a voxel estimation model 1026. The CNN depth model 1022 is configured to receive, from the pre-processing module 1010, a first 2D image captured by the camera 1002 and a second 2D image captured by the camera 1004. The CNN depth model 1022 generates a 3D image based on the first 2D image and the second 2D image. This 3D image (e.g., an RGB+depth image) represents a composite image determined by matching pixel values in the first 2D image with corresponding pixel values in the second 2D image. The 3D image may include, or may be output together with, depth information estimated by the CNN depth model 1022. The depth information may comprise a depth value for each pixel in the output image. To generate the depth information and the 3D output image, the CNN depth model 1022 may have been trained to infer depth values, using training data comprising training images from one or more pairs of cameras and ground truth depth information for the training images.

CNN segmentation model 1024 is analogous to the CNN segmentation model 722 in FIG. 7. However, unlike the CNN segmentation model 722, the CNN segmentation model 1024 operates on 3D data (the 3D image output by CNN depth model 1022). The CNN segmentation model 1024 is configured (e.g., trained) to segment the 3D image generated by the CNN depth model 1022 and classify each segment. Thus, the CNN segmentation model 1024 outputs a segmented 3D image comprising a separate segment for each object detected by the CNN segmentation model 1024. The training of the CNN segmentation model 1024 can be performed in a similar manner as the CNN segmentation model 722 in FIG. 7. However, as with the CNN depth model 1022, the CNN segmentation model 1024 may be trained using 3D data. In some embodiments, the CNN segmentation model 1024 and the CNN depth model 1022 may be combined into a single machine learning model.

Voxel estimation model 1026 is a non-CNN based analog model that maps a LIDAR point cloud received from the pre-processing unit 1016 onto a voxel grid based on an estimate of the voxel heights of points within the grid. The voxel estimation model 1026 estimates the voxel heights based on the geometry of the points in the LIDAR point cloud, and is not configured to recognize objects. Instead, for each grid point, the voxel estimation model 126 simply estimates the height, in terms of a voxel count, of a feature located at the grid point. The feature could belong to a pile, another type of object, the ground, or some other body of material. The voxel estimation model 1026 outputs voxel information to a Bayesian filter 1032 in the estimation module 1030. The voxel information comprises a voxel representation of the physical environment captured by the LIDAR sensor 1006 and indicates the estimated voxel heights as a function of spatial location with the grid. The voxel estimation model 1026 also receives feedback from the Bayesian filter 1032 and updates itself to correct the height estimates according to the received feedback. Initially, the voxel estimation model 1026 may estimate the heights based on certain assumptions (e.g., assuming that each voxel containing a feature is fully occupied by that feature), which estimates are then corrected based on the feedback.

Estimation module 1030 comprises Bayesian filter 1032 and a volumetric calculation module 1034. The Bayesian filter 1032 receives the segmented 3D image from the CNN segmentation model 1024, the voxel information from the voxel estimation model 1026, and radar data from the pre-processing unit 1018. The Bayesian filter 1032 selectively combines these disparate pieces of information to generate a 3D representation of a pile or other object of interest (e.g., a DEM or voxel representation of a pile) for input to the volumetric calculation module 1034. The Bayesian filter 1032 is a histogram-based Bayesian filter comprising an array of Bayesian filters. Each filter in the array of Bayesian filters is configured to predict the correct voxel height for a corresponding grid point using the outputs of the CNN segmentation model 1024, the voxel estimation model 1026, and/or the radar pre-processing unit 1018.

For instance, in certain embodiments, the Bayesian filter 1032 determines a prior probability distribution for the location of a pile based on the heights estimated by the voxel estimation model 1026, and then determines a posterior probability distribution based on the output of the CNN segmentation model 1024 and/or the output of the radar pre-processing unit 1018. Both probability distributions essentially represent the answer to the question "what is the probability that there is a pile of material at this location given the observations derived from sensor data?" Whereas the prior probability distribution expresses the answer to the question based solely on information from the model to be corrected (e.g., the voxel estimation model 1026), the posterior probability distribution expresses the answer taking into account the additional observations provided by the segmented 3D image from the CNN segmentation model 1024 and/or the radar data. Thus, the posterior probability distribution indicates the likelihood of whether or not the height estimates from the voxel estimation model 1026 are correct.

If the probability of a height value from the voxel estimation model 1026 is lower compared to the probability of a height indicated, for the same grid point, by the segmented 3D image or the radar data, then the Bayesian filter 1032 can communicate feedback to the voxel estimation model 1026 indicating the degree of error in the height estimate. Based on this feedback, the voxel estimation model 1026 may revise its estimate and send the revised estimate to the Bayesian filter 1032. This creates a feedback loop between the Bayesian filter 1032 and the voxel estimation model 1026, whereby the output of the voxel estimation model 1026 is repeatedly refined until a certain accuracy level is reached (e.g., the probabilities of every estimated height value exceed a threshold probability value). Once the refining of the estimates stops, the Bayesian filter 1032 can select the most accurate (e.g., highest probability of being correct) of the three sources of input (the segmented 3D image, the voxel grid from the voxel estimation model 1026, or the radar data) for generating the 3D representation of the pile.

In certain embodiments, the Bayesian filter 1032 is configured to communicate feedback to the CNN segmentation model 1024, e.g., to correct the CNN segmentation model 1024 based on the voxel information from the voxel estimation model 1026. The feedback path from the Bayesian filter 1032 to the CNN segmentation model 1024 is omitted from FIG. 10. The feedback communicated to the CNN segmentation model 1024 may indicate a degree of error in the classification of the pixels in the segmented image, where the degree of error is determined based on a posterior probability distribution calculated taking into consideration the voxel information from the voxel estimation model 1026. The feedback to the CNN segmentation model 1024 may be used to adjust one or more weights used by the CNN segmentation model 1024, similar to adjustment that occurs during initial training of the CNN segmentation model 1024.

Volumetric calculation module 1034 is analogous to the volumetric calculation module 736 in FIG. 7. As depicted in FIG. 10, the volumetric calculation module 1034 can be directly coupled to the Bayesian filter 1032 to receive the 3D representation of the pile/object from the Bayesian filter 1032. Volumetric calculation module 1034 is configured to estimate, based on the 3D representation output by the Bayesian filter 1032, the volume of an object of interest (e.g., the pile 900 in FIG. 9). The estimated volume may be determined in a similar manner as the volumetric estimation performed by the volumetric calculation module 736 (e.g., according to the method depicted in FIG. 8) and is output as part of pile information 1050. In the embodiment of FIG. 10, the identification of the ground plane 820 in FIG. 8 can be performed by the Bayesian filter 1032 based on the outputs of the CNN segmentation model 1024 and the voxel estimation model 1026. For each voxel in the voxel grid generated by voxel estimation model 1026, the Bayesian filter 1032 determines, based on information provided for the voxel by the voxel estimation model 1026 and further based on information provided for a corresponding location in the segmented 3D image from the CNN segmentation model 1024, a probability of whether the voxel belongs to the ground as opposed to, for example, a pile. In this manner, the ground plane can be determined by fitting a 2D plane through the voxels that are classified as being part of the ground based on exceeding a threshold probability.

FIG. 11 illustrates an example method for detecting a pile of material and estimating its properties using a single machine learning model according to certain embodiments. The method of FIG. 11 is depicted with reference to a particular arrangement of components on which the method can be implemented. As depicted in FIG. 11, these components may include a plurality of sensors (e.g., a camera 1102, a LIDAR sensor 1104, and a radar sensor 1106), a pre-processing module 1110, and a machine learning model 1120. Similar to the embodiments depicted in FIGS. 7 and 10, the pre-processing module 1110 may include a pre-processing unit for each sensor (e.g., a pre-processing unit 1112 that receives the output of camera 1102, a pre-processing unit 1114 that receives the output of LIDAR sensor 1104, and a pre-processing unit 1116 that receives the output of radar sensor 1106).

In the embodiment of FIG. 11, a single machine learning model (ML model 1120) is configured to perform the tasks of combining data from different sensors, generating a 3D representation of an object of interest based on the combined data, and estimating the volume of the object of interest, possibly along with other characteristics of the object. The ML model 1120 outputs information inferred about the object (e.g., pile information 1150 comprising the estimated volume of a pile of material). The ML model 1120 can be implemented using a neural network, e.g., a CNN or LSTM. Implementing the ML model 1120 using a CNN would reduce computational complexity due to reuse of convolutional kernels, while also providing the advantage of maintaining spatial information as the input of the ML model 1120 is processed through the various layers of the CNN. Implementing the ML model 1120 as an LSTM would reduce the total number of layers while maintaining temporal information (e.g., times at which different images to be combined were captured).

The ML model 1120 may be divided into sections (e.g., subnetworks or subsystems) that handle different portions of the above-mentioned tasks. For example, the ML model 1120 may comprise, in the following order: a first set of neural network layers that perform fusion (combining representations from different sensor types into a single representation, e.g., a 3D representation of a pile), a second set of neural network layers that perform object detection (e.g., detecting a pile of material in the single representation), and a third set of neural network layers that perform volumetric estimation (e.g., estimating a volume of the detected pile of material). In certain embodiments, the ML model 1120 is trained in two phases. During the first phase, each section of the ML model 1120 is trained separately, with any particular section being trained on training data appropriate for the type of task to be performed by that section. During the second phase, the ML model is trained as a whole, using end-to-end training that involves training data representative of inputs to be processed by the ML model 1120 (e.g., camera, LIDAR, and radar data) plus ground truth information for at least the final section (e.g., the section that performs volumetric estimation), and optionally ground truth information for each of the earlier sections. The end-to-end training may adjust the behavior of any particular section when the output of the ML model 1120 indicates that the section is generating incorrect inferences. For example, weights employed by a neural network that performs segmentation may be adjusted based on determining that the segmentations represented in the output of the ML model 1120 are incorrect as compared to ground truth segmentation information. Similarly, weights employed by a neural network that performs volumetric estimation may be adjusted based on a difference between an inferred volume value and a ground truth volume value.

Figure 12:
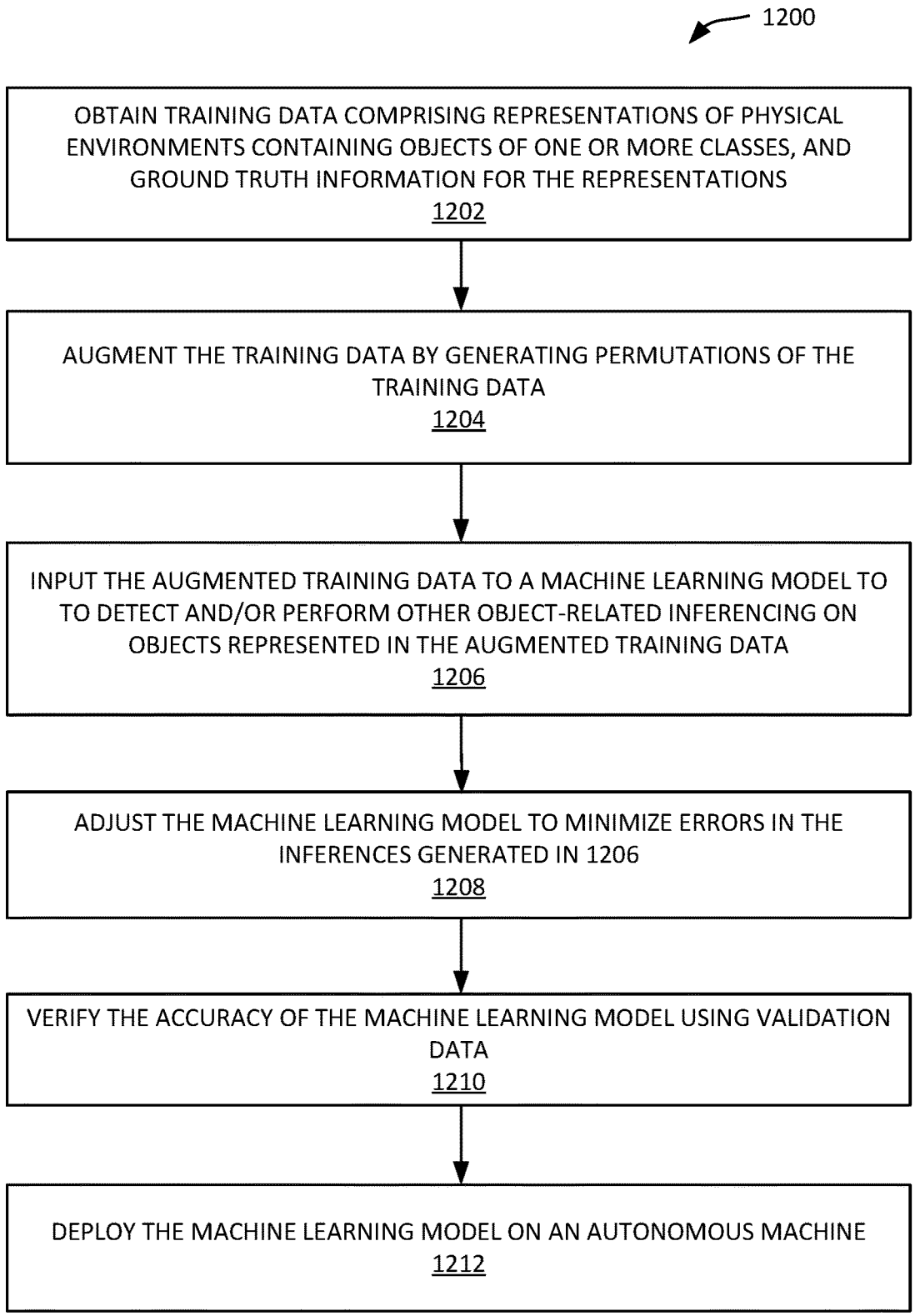
FIG. 12 is a flow chart illustrating a process for training a machine learning model to detect an object and/or perform other object-related inferencing according to certain embodiments.

FIG. 12 is a flow chart illustrating a process 1200 for training a machine learning model to detect an object and/or perform other object-related inferencing according to certain embodiments. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 12 and described below is intended to be illustrative and non-limiting. Although FIG. 12 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 4, the processing depicted in FIG. 12 may be performed by a machine learning model in a perception subsystem (e.g., an ML model implementing the object detection module 420 or the estimation module 430) in conjunction with a computing device or system configured to supply training input to the machine learning model.

At 1202, training data comprising representations of physical environments containing objects of one or more classes are obtained. More specifically, the obtained training data comprises 2D and/or 3D representations of the physical environments. For example, the training data may include a set of labeled training images, such as the training image 500 in FIG. 5. When used to train the ML model to perform semantic segmentation, the training data comprises representations of physical environments containing multiple classes of objects. As described above in connection with the embodiment of FIG. 5, training representations can contain multiple objects of different classes. Alternatively, the ML model can be trained on a single class (e.g., piles), in which case the training data may comprise representations containing only objects of the single class.

Additionally, at 1202, ground truth information for the representations is obtained. The ground truth information can be supplied as part of the representations themselves, for example, by labeling different segments as shown in the embodiment of FIG. 5. Alternatively, the ground truth information can be provided separately from the representations. For instance, when training an ML model to infer the volume of an object, a ground truth volume value can be provided for the object separately from a 2D or 3D representation of the object.

At 1204, the training data obtained at 1202 is augmented by generating permutations of the representations. For example, a training image may be subjected to one or more types of image processing to manipulate the training image at the image level (e.g., by applying a blurring effect to the entire image) or at a sub-image level (e.g., by changing an object in the image). Examples of manipulations include geometric transformations (e.g., scaling, blurring, rotation, hue, gamma or other color adjustments, resizing an image or an object in an image, changing image resolution, adding noise artifacts, and adding visual effects (e.g., to simulate dust on a camera lens, weather conditions such as rain, or other occlusions). The augmenting produces additional training data to supplement the originally obtained training data.

If necessary, the ground truth information obtained in 1202 can be used to generate additional ground truth information for the permutations generated in 1204. For example, if an object in an image is enlarged, the object class labeling can be updated for the resulting image to reflect changes in classification as a result of more pixels now corresponding to the object.

At 1206, the augmented training data (comprising the training data obtained at 1202 plus the additional training data generated at 1204) is input to a machine learning model that is configured to detect and/or perform other object-related inferencing on objects represented in the augmented training data. In certain embodiments, such as the embodiment of FIG. 11, object-related inferencing involves inferring a value for the volume and/or other characteristics of an object. As indicated earlier, in certain embodiments, training data is presented to a machine learning model in a particular order that is configured to achieve a balanced representation of object classes when training on multiple classes. Detection of an object may involve classification of a region within a representation (e.g., a pixel in an image or a point in a point cloud) and determining that adjacent or nearby regions of the same class belong to the same object. As part of the detection, the machine learning model may also segment the representation to generate an output representation indicating boundaries between, for example, a pile object and a non-pile object.

At 1208, the machine learning model is adjusted to minimize errors in the inferences generated in 1206. The degree of error is determined based on ground truth information for the training data obtained at 1202 and ground truth information for the additional training data in 1204. For example, as depicted in the embodiment of FIG. 5, a training representation can be labeled to indicate which regions correspond to certain object classes. As another example, when training an ML model to infer the volume of an object, ground truth volume values can be provided for each object to be detected in the training data. As indicated earlier, adjusting a machine learning model may involve changing a weight through back-propagation to minimize a loss function.

At 1210, the accuracy of the machine learning model is verified using validation data. As indicated earlier, validation data can be a subset of training data set aside specifically for testing the accuracy of the machine learning model after it has been subjected to some amount of training. If the results generated by the machine learning model meet one or more criteria (e.g., a threshold accuracy value), the machine learning model is deemed to be sufficiently trained and the process proceeds to 1212. Otherwise, the processing in 1202-1208 may be repeated on additional training data that was not previously used to train the machine learning model.

At 1212, the machine learning model is deployed on an autonomous machine, for example, by storing the machine learning model in a memory of the autonomous machine. In certain embodiments, the autonomous machine may already have an earlier version of the machine learning model deployed thereon. If so, the deployment in 1212 may involve updating the existing model, e.g., by communicating weights and other parameters of the machine learning model to the autonomous machine. In certain embodiments, the machine learning model is optimized prior to deployment. Optimization may involve reducing the size of the machine learning model by, for example, decreasing a width (e.g., the number of nodes) in one or more layers of a neural network implementing the machine learning model. Optimizations may be determined through statistical analysis of the state of the machine learning model, e.g., by computing histograms of the weights in a layer of a neural network.

Figure 13:
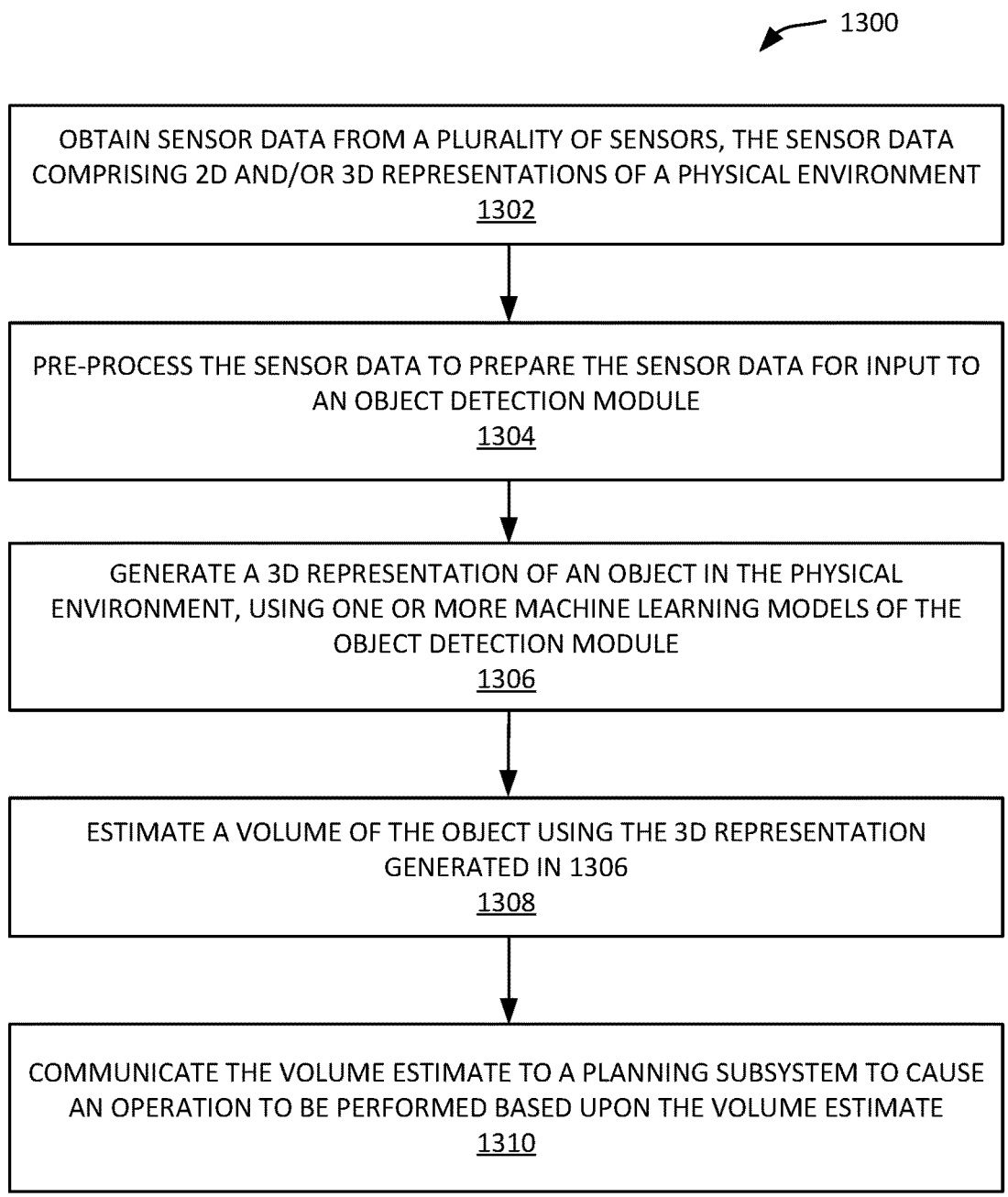
FIG. 13 is a flow chart illustrating a process for performing volumetric estimation according to certain embodiments.

FIG. 13 is a flow chart illustrating a process 1300 for performing volumetric estimation according to certain embodiments. The processing depicted in FIG. 13 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 13 and described below is intended to be illustrative and non-limiting. Although FIG. 13 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 4, the processing depicted in FIG. 13 may be performed by a perception subsystem (e.g., perception subsystem 400).

At 1302, sensor data is obtained from a plurality of sensors. The obtained sensor data comprises 2D and/or 3D representations of a physical environment and may include, for example, 2D images captured by one or more cameras, or point clouds generated by a LIDAR sensor and/or a radar sensor.

At 1304, the sensor data obtained at 1302 is pre-processed (e.g., by pre-processing module 410) to prepare the sensor data for input to an object detection module (e.g., object detection module 420) at 1306. As indicated earlier, pre-processing may involve various reformatting and/or conditioning operations that vary depending on the source of the sensor data (e.g., camera-specific pre-processing, LIDAR-specific, or radar-specific pre-processing).

At 1306, a 3D representation an object in the physical environment (e.g., a DEM or voxel representation of a pile or other object) is generated using one or more ML models of the object detection module. In certain embodiments, such as the embodiments of FIGS. 7 and 10, the 3D representation of the object is generated by combining information from multiple representations of the physical environment and/or the object, including representations derived from different sources of sensor data. For example, in FIG. 10, the Bayesian filter 1032 generates a 3D representation of a pile based on a segmented 3D representation of the environment received from CNN segmentation model 1024, and further based on a voxel representation of the pile received from voxel estimation model 1026. Therefore, as part of generating the 3D representation of the object, at least some of the pre-processed sensor data from 1304 may be input to an ML model configured to segment an input representation according to different classes or, more generally, configured to identify a region of the input representation as corresponding to the object.

At 1308, a volume of the object is estimated using the 3D representation generated in 1306. The volumetric estimation can be performed, for example, by either of the estimation modules depicted in FIGS. 7 and 10 (estimation modules 730 and 1120) or by a machine learning model that generated the 3D representation in 1306 (e.g., ML model 1120 in FIG. 11). Other characteristics of the object may also be estimated at 1308 as part of, or in addition to, estimating the volume of the object. For example, if the volume is estimated according to the method depicted in FIG. 8, then the maximum height of the object is determined. As another example, if the 3D representation is generated based at least in part on LIDAR data, then the 3D representation may include reflectance values from which a metric indicative of the uniformity of the object's material is determined.

At 1310, the volume estimate is communicated to a planning subsystem (e.g., the planning subsystem 206) to cause an operation to be performed based upon the volume estimate. For example, the volume estimate may be communicated to a planning subsystem of the same autonomous machine that performs the process 1300 or to a planning subsystem of a different autonomous machine, to enable a plan of action to be generated based upon the estimated volume. For example, the plan of action may involve adding or removing a certain amount of material from a pile to adjust the volume of the pile toward a target volume. As indicated above, in certain embodiments, the 3D representation may also be output to the planning subsystem together with the volume estimate.

Figure 14:
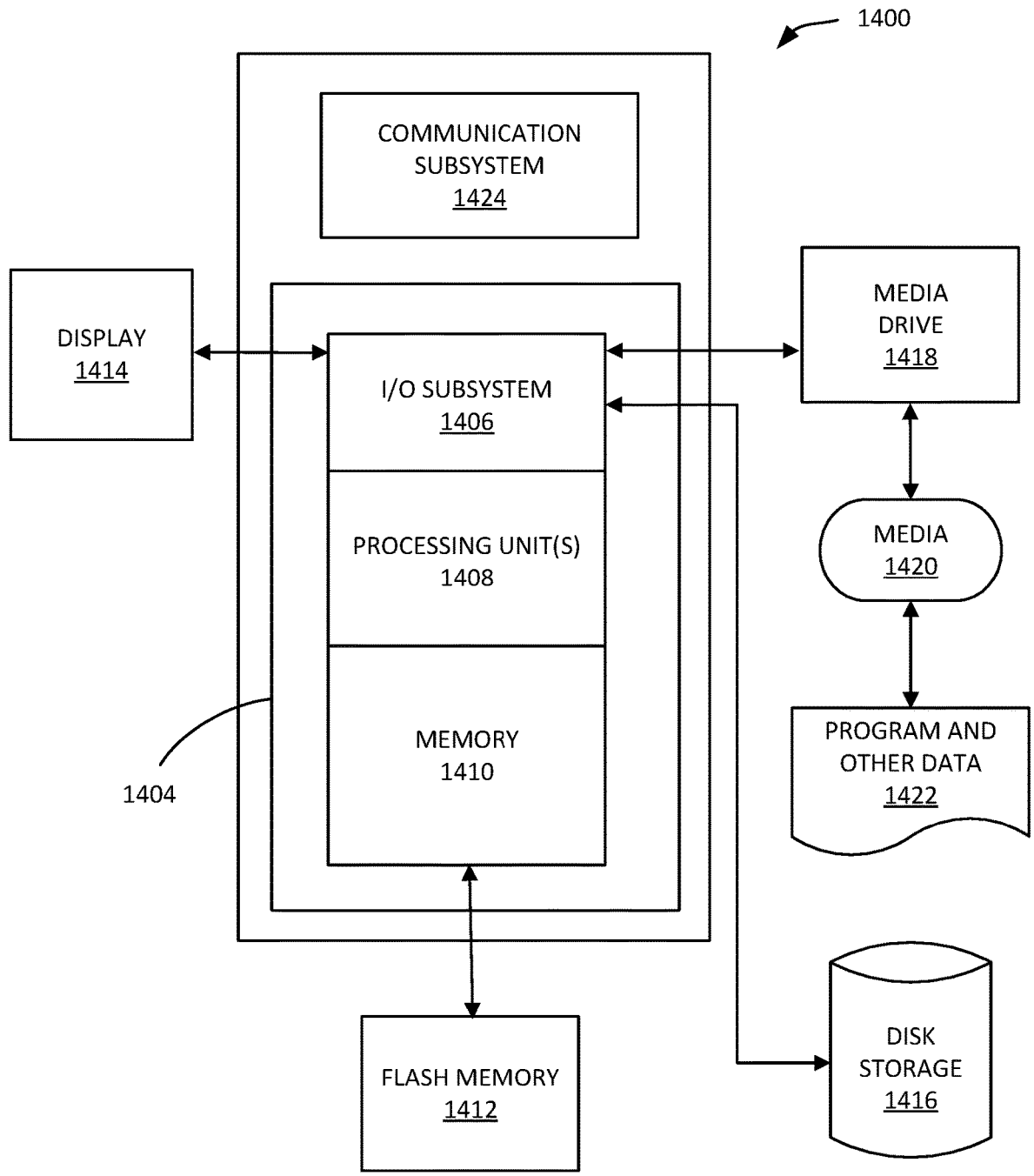
FIG. 14 depicts a simplified block diagram of an exemplary computing system that can be used to implement one or more of the systems and subsystems described in this disclosure and/or to perform any one of the processes or methods described herein.

FIG. 14 depicts a simplified block diagram of an exemplary computing system 1400 that can be used to implement one or more of the systems and subsystems described in this disclosure and/or to perform any one of the processes or methods described herein. For example, in embodiments where autonomous vehicle management system 122 is implemented in software, the software may be executed by a computing system such as computing system 1400 depicted in FIG. 14. Computing system 1400 may include, for example, a processor, memory, storage, and I/O devices (e.g., a monitor, a keyboard, a disk drive, an Internet connection, etc.). In some instances, computing system 1400 may also include other components, circuitry, or other specialized hardware for carrying out specialized functions. In some operational settings, computing system 1400 may be configured as a system that includes one or more units, each of which is configured to carry out some aspects of the processes either in software only, hardware only, or some combination thereof. Computing system 1400 can be configured to include additional systems in order to fulfill various functionalities.

As depicted in embodiment in FIG. 14, computing system 1400 includes one or more processing units 1408, a set of memories (including system memory 1410, computer-readable media 1420, and disk storage 1416), and an I/O subsystem 1406. These components may be communicatively coupled to each other via a bus subsystem that provides a mechanism for the various systems and subsystems of computing system 1400 to communicate with each other as intended. The bus subsystem can be any of several types of bus structures including a memory bus or memory controller, a peripheral bus, a local bus using any of a variety of bus architectures, and the like. In some embodiments, components 1406, 1408 and 1410 may be located on a motherboard 1404.

Processing units 1408 may include one or more processors. The processors may be single or multicore processors. Processor units 1408 can also be implemented using customized circuits, such as application specific integrated circuits (ASICs), or field programmable gate arrays (FPGAs). The processors are configured to execute instructions (e.g., programs, code, etc.) stored in the various memories, such as in system memory 1410, on computer readable storage media 1420, or on disk 1416. The programs or processes may be executed sequentially or in parallel. In certain embodiments, computing system 1400 may provide a virtualized computing environment executing one or more virtual machines. In such embodiments, one or more processors or cores of processors may be allocated to each virtual machine. In some embodiments, a processing unit 1408 may include special purpose co-processors such as graphics processors (GPUs), digital signal processors (DSPs), or the like.

The set of memories can include one or more non-transitory memory devices, including volatile and non-volatile memory devices. Software (programs, code modules, instructions) that, when executed by one or more processors of the processing unit(s) 1408 provide the functionality described herein, may be stored in one or more of the memories. Flash memory 1412 may also be included in certain embodiments. System memory 1410 may include a number of memories including a volatile main random access memory (RAM) (e.g., static random access memory (SRAM), dynamic random access memory (DRAM), and the like) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by the processing unit(s) 1408.

Executable code, program instructions, applications, and program data may be loaded into system memory 1410 and executed by one or more processors of processing unit(s) 1408. One or more operating systems may also be loaded into system memory 1410. Examples of operating systems include, without limitation, different versions of Microsoft Windows®, Apple Macintosh®, Linux operating systems, and/or mobile operating systems such as iOS, Windows® Phone, Android® OS, BlackBerry® OS, Palm® OS operating systems, and others.

In certain embodiments, programming modules and instructions, data structures, and other data (collectively 1422) that are used to provide the functionality of some embodiments may be stored on computer-readable media 1420. A media drive 1418 connected to computing system 1400 may be provided for reading information from and/or writing information to computer-readable media 1420. Computer-readable media 1420 may include non-volatile memory such as a magnetic disk drive, an optical disk drive such as a CD ROM, DVD, a Blu-Ray® disk, or other optical media, Zip® drives, various types of memory cards and drives (e.g., a USB flash drive, SD cards), DVD disks, digital video tape, solid-state drives (SSD), and the like.

I/O subsystem 1406 may include devices and mechanisms for inputting information to computing system 1400 and/or for outputting information from or via computing system 1400. In general, use of the term input device is intended to include all possible types of devices and mechanisms for inputting information to computing system 1400. Input mechanisms may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, cameras, digital camcorders, portable media players, webcams, image scanners, fingerprint scanners, barcode readers, and the like. In general, use of the term output device is intended to include all possible types of devices and mechanisms for outputting information from computing system 1400 to a user or other computer. Such output devices may include one or more types of displays, indicator lights, or non-visual displays such as audio output devices, printers, speakers, headphones, voice output devices, etc. I/O subsystem 1406 may also include interfaces to input and/or output devices external to the I/O subsystem 1406, such as a display 1414.

Computing system 1400 may include a communications subsystem 1424 that provides an interface for computing system 1400 to communicate (e.g., receive data, send data) with other computer systems and networks. Communication subsystem 1424 may support both wired and/or wireless communication protocols. For example, communication subsystem 1424 may enable computing system 1400 to be communicatively coupled with remote sensors, with a network such as the Internet, and the like. Various different communication protocols and formats may be used for the communications such Wi-Fi, Bluetooth® (and/or other standards for exchanging data over short distances includes those using short-wavelength radio transmissions), USB, Ethernet, cellular, an ultrasonic local area communication protocol, etc.

Computing system 1400 can be one of various types, including a mobile device (e.g., a cellphone, a tablet, a PDA, etc.), a personal computer, a workstation, or any other data processing system. Due to the ever-changing nature of computers and networks, the description of computer system 1400 depicted in FIG. 14 is intended only as a specific example. Many other configurations having more or fewer components than the system depicted in FIG. 14 are possible.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

The described features, structures, or characteristics of described in this disclosure may be combined in any suitable manner in one or more embodiments. In the description herein, numerous specific details are provided, such as examples of programming, software modules, user selections, network transactions, database queries, database structures, hardware modules, hardware circuits, hardware chips, etc., to provide a thorough understanding of various embodiments. One skilled in the relevant art will recognize, however, that the features may be practiced without one or more of the specific details, or with other methods, components, materials, and so forth. In other instances, well-known structures, materials, or operations are not shown or described in detail to avoid obscuring novel aspects.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flow charts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a controller system of an autonomous machine, sensor data from a plurality of sensors, the sensor data comprising a first representation of a physical environment and a second representation of the physical environment, wherein each of the first representation and the second representation is a two-dimensional (2D) or three-dimensional (3D) representation containing data associated with a pile of material in the physical environment;

generating, by the controller system, a 3D representation of the pile of material, the generating of the 3D representation of the pile of material comprising:
  identifying a region in the first representation as corresponding to the pile of material;
  identifying a region in the second representation as corresponding to the pile of material; and
  determining, based on the identified regions in the first representation and the second representation, a boundary of the pile of material;

estimating, by the controller system, a volume of the pile of material based upon the 3D representation of the pile of material; and communicating, by the controller system, information about the pile of material to a planning subsystem of the autonomous machine or a planning subsystem of a second autonomous machine, wherein the information about the pile of material includes the estimated volume, and wherein the communicating of the information about the pile of material causes an operation to be performed autonomously, by the autonomous machine or the second autonomous machine, and with respect to the pile of material.

2. The method of claim 1 further comprising performing, by the autonomous machine, the operation based on the estimated volume.

3. The method of claim 1, wherein the first representation is an image generated using at least one camera, and wherein identifying the region in the first representation as corresponding to the pile of material comprises:
  inputting the first representation to a machine learning model of the controller system, the machine learning model having been trained to detect multiple classes of objects, the multiple classes of objects including a pile class; and
  receiving, as an output of the machine learning model, a segmented representation of the physical environment, the segmented representation including a segment corresponding to the pile class.

4. The method of claim 3, further comprising:
  training the machine learning model prior to the receiving of the sensor data, wherein the training of the machine learning model comprises:
    obtaining a set of training data, the set of training data comprising at least one of 2D representations or 3D representations of real-world environments and being labeled with information indicating classes of objects represented in the training data;
    augmenting the set of training data, the augmenting comprising generating additional training data through image processing performed on the set of training data;
    inputting the augmented set of training data to the machine learning model; and
    adjusting the machine learning model based on comparing inferences generated by the machine learning model using the augmented set of training data to ground truth information corresponding to correct inferences for the augmented set of training data.

5. The method of claim 4, wherein the augmenting of the set of training data comprises at least one of the following types of image processing: scaling, blurring, rotation, color adjustment, resizing, changing image resolution, adding noise artifacts, or adding visual effects that simulate occlusions or weather conditions.

6. The method of claim 4, further comprising:
  determining an order in which training data from the augmented set of training data is input to the machine learning model, wherein the order maintains a ratio between a number of instances of a first class of object and a number of instances of a second class of object.

7. The method of claim 1, wherein the first representation is an image generated using one or more cameras, and wherein the second representation is a point cloud generated using a LIDAR or radar sensor.

8. The method of claim 7, wherein identifying the region in the second representation as corresponding to the pile of material comprises:
  inputting the point cloud to a machine learning model that has been trained to detect pile shapes from point clouds; and
  receiving, as an output of the machine learning model, a voxel representation of a detected pile shape.

9. The method of claim 8, wherein generating the 3D representation of the pile of material comprises:
  generating an additional voxel representation by combining the voxel representation of the detected pile shape with a segmented image generated from the first representation; and
  smoothing the additional voxel representation by fitting a geometric mesh over the voxel representation.

10. The method of claim 7, wherein identifying the region in the second representation as corresponding to the pile of material comprises:
  inputting the second representation to a voxel estimation model configured to generate a voxel representation of the physical environment by estimating, based on a geometry of points in the point cloud, voxel heights in the voxel representation.

11. The method of claim 10, wherein generating the 3D representation of the pile of material comprises:
  inputting the voxel representation to a Bayesian filter configured to determine, for each estimated voxel height, a probability that the estimated voxel height is correct based on data from the first representation, wherein the first representation is a depth image; and
  selecting, by the Bayesian filter and based on the determined probabilities, between information from the depth image and information from the voxel representation for generating the 3D representation of the pile of material.

12. The method of claim 11, further comprising:
  communicating, from the Bayesian filter to the voxel estimation model, feedback that causes the voxel estimation model to revise the estimated voxel heights to be closer to voxel heights indicated by the depth image.

13. The method of claim 11, further comprising:
  generating the depth image based on a disparity between an image from a first camera with an image from a second camera; and
  segmenting the depth image for input to the Bayesian filter, wherein the segmenting of the depth image is performed by a machine learning model of the controller system.

14. The method of claim 1, wherein estimating the volume of the pile of material comprises:
  determining a 3D shape corresponding to approximately half the pile of material, wherein the 3D shape is bounded by a ground plane, a back plane, and the boundary of the pile of material;
calculating a volume of the 3D shape; and
estimating the volume of the pile of material to be twice that of the volume of the 3D shape.

15. The method of claim 1, further comprising:
receiving additional sensor data representing the pile of material from different sides; and
generating the 3D representation of the pile of material using the additional sensor data.

16. A system comprising:
a plurality of sensors; and
a controller system coupled to the plurality of sensors, the controller system configured to:
 receive sensor data from the plurality of sensors, the sensor data comprising a first representation of a physical environment and a second representation of the physical environment, wherein each of the first representation and the second representation is a two-dimensional (2D) or three-dimensional (3D) representation containing data associated with a pile of material in the physical environment;
 generate a 3D representation of the pile of material, the generating of the 3D representation of the pile of material comprising:
  identifying a region in the first representation as corresponding to the pile of material;
  identifying a region in the second representation as corresponding to the pile of material; and
  determining, based on the identified regions in the first representation and the second representation, a boundary of the pile of material;
 estimate a volume of the pile of material based upon the 3D representation of the pile of material; and
 communicate information about the pile of material to a planning subsystem of an autonomous machine, wherein the information about the pile of material includes the estimated volume, and wherein the communicating of the information about the pile of material causes an operation to be performed autonomously, by the autonomous machine, and with respect to the pile of material.

17. The system of claim 16, wherein the plurality of sensors includes one or more cameras and a LIDAR or radar sensor, wherein the first representation is an image generated using the one or more cameras, and wherein the second representation is a point cloud generated using the LIDAR or radar sensor.

18. A method comprising:
receiving, by a controller system of an autonomous machine, sensor data from a plurality of sensors, the sensor data comprising a first representation of a physical environment and a second representation of the physical environment, wherein the first representation and the second representation are generated using different types of sensors, and wherein each of the first representation and the second representation is a two-dimensional (2D) or three-dimensional (3D) representation containing data associated with a pile of material in the physical environment;
estimating, by the controller system, a volume of the pile of material, wherein estimating the volume of the pile of material comprises:
 inputting the first representation and the second representation to a machine learning model trained to detect piles of materials and infer their volume; and
 receiving, as an output of the machine learning model, a value for the volume of the pile of material, the value for the volume of the pile of material being inferred from the first representation and the second representation; and
communicating, by the controller system, information about the pile of material to a planning subsystem of the autonomous machine or a planning subsystem of a second autonomous machine, wherein the information about the pile of material includes the value for the volume of the pile of material, and wherein the communicating of the information about the pile of material causes an operation to be performed autonomously, by the autonomous machine or the second autonomous machine, and with respect to the pile of material.

19. The method of claim 18, further comprising:
training the machine learning model prior to inputting the first representation and the second representation to the machine learning model, wherein training the machine learning model comprises:
 inputting a set of training representations to the machine learning model;
 receiving a volume value inferred based on the set of training representations;
 comparing the inferred volume value to a ground truth volume value for the set of training representations; and
 adjusting the machine learning model based on a difference between the ground truth volume value and the volume value inferred based on the set of training representations.

20. The method of claim 19, wherein the machine learning model comprises a plurality of subsystems, each subsystem of the plurality of subsystems configured to perform a different one of the following: combining representations from different sensor types into a single representation, detecting a pile of material in the single representation, and estimating a volume of the detected pile of material; and
 wherein the training of the machine learning model further comprises training each subsystem separately prior to performing end-to-end training of the machine learning model as a whole.

* * * * *